(12) United States Patent
Bader

(10) Patent No.: US 7,789,159 B1
(45) Date of Patent: Sep. 7, 2010

(54) METHODS TO DE-SULFATE SALINE STREAMS

(76) Inventor: Mansour S. Bader, P.O. Box 10675, College Station, TX (US) 77842-0675

( * ) Notice: Subject to any disclaimer, the term of this patent is extended or adjusted under 35 U.S.C. 154(b) by 321 days.

(21) Appl. No.: 12/215,560

(22) Filed: Jun. 28, 2008

Related U.S. Application Data

(63) Continuation-in-part of application No. 11/139,881, filed on May 27, 2005, now Pat. No. 7,392,848.

(51) Int. Cl.
*E21B 43/22* (2006.01)
*B01D 61/36* (2006.01)
*B01D 61/02* (2006.01)
B01D 61/00 (2006.01)
E21B 43/00 (2006.01)

(52) U.S. Cl. .................. 166/371; 166/279; 166/300; 166/309; 166/310; 210/650; 210/652; 210/640

(58) Field of Classification Search .................. None
See application file for complete search history.

(56) References Cited

U.S. PATENT DOCUMENTS

| 4,327,146 A * | 4/1982 | White ................. 428/308.8 |
| 4,347,704 A * | 9/1982 | Marquardt et al. .......... 60/648 |
| 6,365,051 B1 * | 4/2002 | Bader ..................... 210/640 |
| 6,372,143 B1 * | 4/2002 | Bradley ................... 210/638 |
| 7,093,663 B1 * | 8/2006 | Bader ..................... 166/371 |
| 7,392,848 B1 | 7/2008 | Bader |
| 7,501,065 B1 * | 3/2009 | Bader ..................... 210/652 |

* cited by examiner

*Primary Examiner*—Krishnan S Menon

(57) ABSTRACT

Methods are disclosed to de-sulfate saline streams such as seawater, brine from seawater desalination plants, and the like. The disclosed methods can also co-produce de-ionized water and inorganic materials from such de-sulfated saline streams.

38 Claims, 13 Drawing Sheets

METHODS TO DE-SULFATE SALINE STREAMS

This application is a continuation-in-part of U.S. patent application Ser. No. 11/139,881, May 27, 2005, now U.S. Pat. No. 7,392,848.

BACKGROUND OF THE INVENTION

Relation Between Sulfate Scale Prone Species and the Volume of Brine from any Seawater Desalination Plants FIG. 1, for example, shows the aqueous solubility limits of the three principal hydrates of calcium sulfate in seawater from the Arabian Gulf as a function of temperatures and concentration factors. The figure reveals the approximate super-saturation envelope of such hydrates; the key critical obstacle in desalting seawater that causes enormous engineering difficulties, hinders the production of low cost water, and directly controls the recovery ratio of any seawater desalting plant regardless of the employed technology.

The overall recovery of any thermal-driven desalination method such as the Multi-Stage Flash (MSF) or Multi-Effect Distillation (MED) is between 10% and 20% (their concentration factors are between 1.11 and 1.25). Thus, the volumes of their brine streams are between 80 and 90% of feed streams. Such an extremely low water recovery in MSF, MED, and the like is mainly attributed to the extreme calcium sulfate scale boundary. At the operating temperatures range of MSF or MED (80-110° C.), the possible forms of calcium sulfate are anhydrite and/or hemihydrate. As shown in FIG. 1, the solubility limits of calcium sulfate anhydrite or hemihydrate are inversely and steeply proportional with temperatures.

The overall recovery of pressure-driven desalination methods such as Reverse Osmosis (RO) in treating seawater from the Arabian Gulf, for instance, is at best 30%, which means that the volume of the brine stream is at least 70% of the feed stream (the concentration factor is about 1.43). The main reason for a better recovery from RO relative to MSF or MED is that RO is operated at ambient temperatures, and thus calcium sulfate is in the form of dihydrate (gypsum). Inspection of FIG. 1 reveals that the saturation limit of gypsum is appreciably higher than the saturation limits of anhydrite or hemihydrate and slightly increases with increasing seawater concentration factors, which should allow a higher recovery (greater than 30%) for RO. However, the concentration polarization phenomenon in RO forces a significant buildup of gypsum at the membrane surface to reach much higher concentrations than the bulk of seawater feed stream, along with the increase of the osmotic pressure of seawater as the concentration factor increases preclude RO from reaching higher recovery ratios.

The addition of inhibitors to seawater feed stream is the typical gimmick method in seawater desalination plants to delay the formation of sulfate scale. Scale inhibitors, however, are primitive in nature with proven limited values in solving sulfate scale problems, protecting processing equipment, increasing overall recovery, and reducing water production cost.

Regardless of the current sulfate scale delay methods or the desalting concepts, the volume of brine streams from seawater desalination plants remains significant (between 70% and 90% of the feed stream). The discharge of such brine streams into the sea could increase the salinity around the intake lines of seawater desalination systems, particularly when the dispersion of such streams is not fast enough (e.g., not enough natural current at the disposal site, relatively shallow water, and absence of mechanical dispersion devices). In addition, the lack of oxygen in such streams combined with higher salinity, higher temperature, residues of deoxygenating chemicals (e.g. sodium metabisulfate) and concentrated toxic species (e.g., derivatives of boron and chlorine) would adversely affect the marine environment. Furthermore, the near induction precipitation of gypsum at the discharge temperatures range (40-55° C.) in such streams would create a cloud of turbid precipitates once its discharged back to seawater (due to salinity differences between seawater and the brine stream) that poisons the marine habitat.

Utilization of Brine from Seawater Desalination Plants

However, brine streams from seawater desalination plants are depleted of suspended matters, bacteria, oxygen, and alkaline scale (the bicarbonate ion if the acidification step is done properly). All of such critical parameters are controlled in the pre-treatment stage of seawater feed stream. Brine streams are therefore readily processable, which is their attractive value.

If depleted of sulfate scale prone species or nearly completely de-sulfated, brine streams from sweater desalination plants would serve different viable applications such as the production of: (1) potable water using low-grade thermal processes; (2) reusable streams that are free of sulfate scales prone species to feed within the desalination plant complex, for instance, heat recovery steam generators, steam turbines and auxiliary boilers; and (3) sulfate-free streams for oil-fields saline water injection operations. Economic values from the concentrated inorganic materials (e.g., gypsum, brucite, etc.) can also be extracted as valuable commodities.

To illustrate the benefits of using brine streams from seawater desalination plants, the following discussion highlights the utilization of such streams to provide, for example, de-sulfated saline streams for oil fields water injection operation as well as other by-products such as de-ionized water and salable salts.

Problems Associated with the on-Going Oil-Fields Seawater Injection Approach

Pressure maintenance in oil-fields through seawater injection is taking place on a massive way throughout the world. In some giant oil-fields, the current capacity of seawater injection is well over 10 million barrels per day. As illustrated in FIG. 2, however, there are economical, technical and environmental problems associated within: (1) seawater pre-treatment facilities themselves; and (2) oil-fields that are subjected to seawater injection. These two separate but inter-related sets of problems are highlighted in the following discussion.

Problems within Seawater Pre-Treatment Facilities

Typical seawater pre-treatment facilities are based on the following simple processing steps: (1) disinfection to eliminate biological growth; (2) addition of coagulants to enlarge the sizes of suspended solids; (3) direct filtration to remove suspended solids; (4) deoxygenation to deplete oxygen; and (5) addition of scale and corrosion inhibitors to delay scale and corrosion problems in oil fields. The operating costs based on my estimate for seawater pre-treatment facilities are between $0.15 and $0.20 per barrel. Such rough facilities are therefore expensive to operate in spite of their apparent simplicity.

Onshore seawater pre-treatment facilities, in particular, not only do not draw seawater from a deep water column to take advantage of reduced oxygenation, suspended solids and microbial activity at depth, but might also be located in areas that are known, for instance, to have a high silt index. In addition, most if not all facilities are fitted with uncoated carbon steel pipelines including the transfer pipeline to the targeted oil fields. Such facilities are inherently flawed, and subsequently they are prone to: (1) contend with the coagulation-filtration steps within the pre-treatment facility (improper location); and (2) regenerate an unacceptable high level of total suspended solids (TSS) at the manifold of injection wells after the completion of seawater pre-treatment (uncoated transfer pipeline).

Within the operation of most seawater pre-treatment facilities, iron derivatives (ferrous sulfate or ferric sulfate or ferric chloride) as coagulants, are also improperly utilized. Such iron coagulants produce iron sludge (ferric hydroxide) in backwash-water recovery ponds. Their generated backwash-water has the highest solids load compared to other types of coagulants (alum, ployelectrolytes, etc.) and is difficult to dewater (thickens poorly).

Since such seawater pre-treatment facilities are based on the "direct filtration" concept, this means that the three independent steps of flocculation, sedimentation, and filtration are combined in one step. The "direct filtration" concept is effective for high-quality raw water, not seawater with high silt index. With seawater, "direct filtration" might be achieved by adding an excessive amount of a coagulant, far in excess of the amount needed to neutralize the charge on the suspended particles, and most of the suspended particles will be swept from the bulk of seawater by becoming enmeshed in the precipitating floc (e.g., ferric hydroxide in the case of using iron sulfate).

The problems with this "sweep floc" procedure include the: (1) adverse effect on the permeability of the filtration media contained within the filters, and thus more frequently filters backwash; (2) generation of excessive amounts of sludge with high solids load (e.g., ferric hydroxide) in the backwash-water recovery ponds; and (3) escape of a significant amount of the iron ion from the filters to effluent seawater, which with the aid of the deoxygenation step (in the later stage) precipitates as iron sulfide (raise the TSS again after the filtration step).

Furthermore, operators tend to overdose the seawater feed stream with chlorine as a biocide to kill organisms. Such an overdosing, however, produces an undesirable excess of hypochlorous acid that attacks and corrodes the uncoated piping system. This would increase the TSS level within the facility and its transfer lines. As such, the amount of chlorine, which is considered as a trivial procedure, should also be optimized so that it will not be in excess of the amount needed to sanitize seawater.

The combination of uncoated carbon steel pipelines, the use of inappropriate coagulant, the overdose of chlorine, the natural existence of small concentrations of the uranium ion (5 µg/L) in seawater, along with the deoxygenating step will also introduce the problem of "Technologically Enhanced Naturally Occurring Radioactive Materials" (TE-NORM). TE-NORM problems are increasingly becoming an environmental issue, particularly in aging seawater pre-treatment facilities.

In some cases, aged pipelines that are initially bare 5 µg/L of the uranium ion are significantly elevated to about 16,000 mg/L. Such a high concentration of the uranium ion found in precipitated solids in corroded pipelines exceeds the permissible limit of 150 pico-Curies per gram. Ponds that hold blowdown water from cleaning pipelines of precipitating debris as well as the decommissioning of scraped pipelines represent radioactive hazards.

The pore throat diameter in oil reservoirs varies from 1 to 11 microns. If the TSS reduction steps are cumbersome, then the consequence of injecting roughly pre-treated seawater with an unacceptable level of solids loading is costly. The cost is not only in the direct form of operating a rough pre-treatment facility and adding a second filtration setup (after transferring pre-treated seawater via pipelines but before injection wells) but also in other substantial indirect forms within oil-fields such as injectivity decline and pore plugging, pumps degradation, and application of higher pressures that could possibly lead to the creation and growth of unwanted fractures.

Problems within the Subjected Oil-Fields to Seawater Injection

Aside from the above discussed issues within strictly seawater pre-treatment facilities, the presence of sulfate in seawater causes enormous sulfate-related operational problems within oil-fields. Table 1, for example, reveals that seawater from the Arabian Gulf contains an appreciable concentration of sulfate whereas oil-fields formation waters consistently contain excessive concentrations of calcium and strontium. It should be pointed out that some oil producers use sulfate-rich natural brine that contains nearly equivalent ions concentrations as in seawater (Table 1).

Injection of seawater (or sulfate-rich natural brine) without the selective removal of sulfate would generate: (1) sulfate scale deposits in the forms of sparingly soluble alkaline cations (e.g., calcium, strontium, barium, and radium) from injection to producing wells along with the possible attachment of "Naturally Occurring Radioactive Materials" (NORM) to such sulfate scale deposits; and (2) hydrogen sulfide. FIG. 3 summarizes these sulfate problems; what I coined the "sulfate valley of death".

Sulfate scale deposits are hard, adherent, almost insoluble in mineral acids or other common solvents, and difficult to remove mechanically. Hence, such deposits could cause severe flow restrictions within the drainage radius inside the formation, within the wellbore, and in processing and surface equipment. The visible part of sulfate scale damages, which is manageable to some degree, can be seen within the operating equipment and surface processing facilities (e.g., stuck downhole pumps, plugged perforations and tubing strings, choked flow lines, frozen valves, etc.). However, the accumulation of sulfate scale deposits within the invisible oil-bearing formation could cause the ultimate damage (permanent producing wells shut down).

As the case with seawater desalination plants, in spite of a large number of proprietary chemical blends that are available as scale inhibitors and dissolvers, sulfate scale prevention or remediation with such chemicals has proved difficult, very expensive, and of limiting value for solving the scale problem or protecting reservoirs formation. Once sulfate scale is encountered beyond the ability of any type of chemical treatment in a given field, mechanical drilling or reaming is the common remedial measure. However, mechanical treatment is very expensive (e.g., wells shutdown, removal of rigs and processing equipment, etc.) and limited to the removal of scale within the reachable range of processing equipment. Therefore, the shared disadvantage of both chemical and mechanical treatment is the inability to mitigate any downhole formation damages.

Most, if not all, oil producers do not properly document the exact cost of sulfate scale remedial workovers. However, one of the major oil producers in the Arabian Gulf region that utilizes seawater injection without the selective removal of sulfate for over 25 years has recently spent $33 million to carry out 15 sulfate scale remedial workovers in one impacted field. This cost does not include the cost of deferred oil production, which is substantial, since the production of some wells is over 12,000 barrel per day (BPD).

Uranium (U-238 and U-235) and thorium (Th-232) are present in the earth's crust as immobile species, whereas their γ-emitting daughter nuclides, radium and its isotopes, can be transported with formation water. Once radium isotopes are leached from their lithological origin, they are no longer supported by their ancestors. Thus, they develop their own decay series that refers to Naturally Occurring Radioactive Materials (Ra-226, Rn-222, Po-218, Pb-214, Bi-214, Po-214, Pb-210, Bi-210, Po-210, stable Pb-206).

Radium and its isotopes tend to co-precipitate with other sparingly soluble alkaline cations in the forms of sulfate, and thus oil-fields produced water could become radioactive. As such, external (near any processing equipment), and internal (during maintenance or workovers) radioactive hazards could exist due to NORM adherent to sulfate scale during processing. Direct costs of NORM inspection and disposal include radionuclide analysis, actual disposal operation, transportation, storage and equipment decontamination. Long-term liability is an additional cost.

Thermophilic sulfate reducing bacteria in the downhole converts sulfate to hydrogen sulfide, which would lead to reservoir souring. Sour hydrocarbons ought to be treated before it can be sold, and thus hydrogen sulfide scrubbing or other treatment methods must be employed. Severe corrosion of both downhole and surface equipment can also result from the generation of hydrogen sulfide. As such, hydrogen sulfide related workovers must be routinely conducted to combat and avert corrosion problems. Hydrogen sulfide is also lethal at levels above 1000 mg/L for exposures over two minutes, and therefore, installations of worker-health safeguards monitoring systems are required.

The only logical effective approach to prevent sulfate scale problems is undoubtedly the selective removal of sulfate from seawater before injection. However, there is a persistent tendency within oil producers to use available water for injection operations, regardless of the fact that sulfate scale will cause critical problems, and then attempting to remedy such problems that are deliberately allowed to occur. Such an irrational and expensive tendency can mainly be attributed to two factors.

The first factor is the trap of focusing on short-term solutions to current operation or production problems rather than the whole anticipated long-term problems. Short-term solutions often become long-term lingering problems.

The second factor is that sulfate scale deposits in the early stages (pre-seawater breakthrough) most likely conceive outside the visible injection-producing wells, but within the invisible oil-bearing formation. Vague familiarity with oil-gas fields seawater injection operations, lack of knowledge (e.g., personal experience, accurate water analysis, reliable water incompatibility analysis, etc.), and confusion about the extent of the formation and well-bore damage caused by sulfate scale quite often lead to the "deny-it-all" attitude that "sulfate-scale is not much of a problem" until it is too late.

THE APPROACH OF THIS INVENTION

For an oil producer that has been misguided from the beginning, for instance, in locating its seawater pre-treatment facility, using inappropriate coagulants, installing uncoated carbon steel transfer lines, and more importantly injecting the sulfate-rich seawater, a radical yet complete and proper (technically, economically and environmentally) "change of direction" in its saline water injection is the only logical approach.

In this patent, the use of de-sulfated brine streams from nearby seawater desalination plants for oil-fields saline water injection operations is invented. The rationale behind this invention is that brine streams are readily processable and plentifully available when and where needed. Thus, the cost of operating cumbersome seawater pre-treatment facilities, that other than providing pressure and oil sweeping support, have an overall negative value on oil producing wells, will be diverted to the de-sulfation of brine streams to boost rather than to diminish the long-term productivity of producing wells, which is the ultimate investment of oil producers.

The foundation of this invention rests on how to: (1) increase the value and quality of the targeted saline stream; and (2) implement it in such a way that quality would not cost more than the current situation and serve the long-term goals. Thus, this invention provides innovative off the beaten path methods that could directly contribute to the much needed "change of direction" within the on-going practice of oil-fields saline water injection and seawater desalination.

The primary objective of this invention is to effectively eliminate the sulfate ion: (1) from brine streams of seawater desalination plants to provide valuable oil-fields saline water injection operations; and (2) from seawater to enhance the performance of seawater desalination plants and/or to provide valuable oil-fields saline water injection operations. A second objective is to recover segregated salts with an acceptable level of purity as valuable commodities from the processed brine stream or seawater. A third objective is to produce, when needed, additional de-ionized water from the processed brine stream or seawater to fulfill other possible needs (e.g., oil-fields steam injection or other applications). A fourth objective is to provide environmentally benign (zero discharge) methods that not only efficiently utilize a waste (brine) stream but also simultaneously preventing the generation of a new waste from the processed original waste stream. A final objective is the economic attractiveness of the invented methods that serve vital industries such as oil production and seawater desalination.

SUMMARY OF THE INVENTION

In one aspect, the present invention provides a method for separating sulfate from saline water to produce nearly sulfate-free saline stream and inorganic materials. The inventive method comprises the steps of: (a) removing sulfate from saline water; (b) injecting the nearly sulfate-free saline stream into subterranean formation for hydrocarbons recovery; or (c) feeding the nearly sulfate-free saline stream into conventional seawater desalinations plants and auxiliary equipments; or (d) producing de-ionized water from the nearly sulfate-free saline stream by membrane distillation; (e) producing gypsum boards or materials from gypsum slurry; or (f) producing potassium sulfate and calcium chloride from gypsum slurry. Sulfate is removed from saline water in step (a) by (i) mixing calcium chloride rich formation water with saline water to allow the concentration of the calcium ion to exceed the concentration of the sulfate ion in saline water to produce intermediate concentrate; (ii) pressurizing the intermediate concentrate into a precipitator at pressure between 50 psi and 1200 psi through at least one injection nozzle to produce a jet stream of the intermediate concentrate; (iii) pressurizing an amine solvent or an amine solvent with modifier into the precipitator at pressure between 50 psi and the critical pressure of the amine solvent or the amine solvent with modifier through at least one injection nozzle to form precipitates of gypsum from the intermediate concentrate; (iv) removing the gypsum precipitates from the intermediate concentrate by filtration to produce gypsum slurry; and (iv) removing at least most of the amine solvent or the amine solvent with modifier from the intermediate concentrate by a stripping unit to produce nearly sulfate-free saline stream. Producing gypsum boards or materials from gypsum slurry in step (e) by (i) separating gypsum slurry into moist solid gypsum and liquor stream; (ii) removing at least most of the remaining amine solvent or amine solvent with modifier from liquor stream; (iii) recycling liquor stream to the intermediate concentrate; (iv) molding the moist solid gypsum to produce gypsum boards or gypsum materials; and (v) allowing gypsum boards or gypsum materials to dry. Potassium sulfate and calcium chloride are produced from gypsum slurry in step (f) by (i) adding sylvite or sylvinite to gypsum slurry to produce an intermediate liquor stream; (ii) adding an amine solvent or an amine solvent with modifier to the intermediate liquor stream to form precipitates comprising potassium sulfate; (iii) removing precipitates from the intermediate liquor stream; (iv) removing at least most of the amine solvent or the amine solvent with modifier from the intermediate liquor stream; (v) recycling the intermediate liquor stream comprising at least dissolved calcium chloride to the intermediate concentrate; or (vi) recovering the intermediate liquor stream comprising at least calcium chloride brine.

Saline water is seawater, brine streams from seawater desalination plants, sulfate-rich natural brine, flue gas desulphurization water, or a combination thereof. Calcium chloride rich formation water is aquifers water, oil-fields produced water, coal-bed produced water, methane-bed produced water or a combination thereof. The injection jet nozzle is coaxial nozzle, spray nozzle, vibrating nozzle, premixed nozzle, or a combination thereof. The amine solvent is selected from the group consisting of isopropylamine, propylamine, dipropylamine, diisopropylamine, ethylamine, diethylamine, methylamine, and dimethylamine. The modifier is nitrogen, nitrous oxide, or a combination thereof in liquid or gaseous state. The membrane distillation is vacuum membrane distillation, direct contact membrane distillation, membrane osmotic distillation, or a combination thereof.

In another aspect, the present invention provides a method for separating sulfate and brucite from saline water to produce nearly sulfate-brucite free saline stream and inorganic materials. The inventive method comprises the steps of: (a) removing sulfate from saline water to produce nearly sulfate-free saline stream; (b) removing brucite from the nearly sulfate-free saline stream to produce nearly sulfate-brucite free saline stream; (c) injecting the nearly sulfate-brucite free saline stream into subterranean formation for hydrocarbons recovery; or (d) feeding the nearly sulfate-brucite free saline stream into conventional seawater desalinations plants and auxiliary equipments; or (e) producing de-ionized water from the nearly sulfate-brucite free saline stream by membrane distillation; (f) producing gypsum boards or materials from gypsum slurry; or (g) producing potassium sulfate and calcium chloride from gypsum slurry. Sulfate is removed from saline water in step (a) by (i) mixing calcium chloride rich formation water with saline water to allow the concentration of the calcium ion to exceed the concentration of the sulfate ion in saline water to produce intermediate concentrate; (ii) pressurizing the intermediate concentrate into a precipitator at pressure between 50 psi and 1200 psi through at least one injection nozzle to produce a jet stream of the intermediate concentrate; (iii) pressurizing an amine solvent or an amine solvent with modifier into the precipitator at pressure between 50 psi and the critical pressure of the amine solvent or the amine solvent with modifier through at least one injection nozzle to form precipitates of gypsum from the intermediate concentrate; (iv) removing gypsum precipitates from the intermediate concentrate by filtration to produce gypsum slurry; and (iv) removing at least most of the amine solvent or the amine solvent with modifier from the intermediate concentrate by a stripping unit to produce nearly sulfate-free saline stream. Brucite is removed from the nearly sulfate-free saline stream in step (b) by (i) pressurizing nearly sulfate-free saline stream into a second precipitator at pressure between 50 psi and 1,200 psi through at least one nozzle to produce a jet stream of nearly sulfate-free saline stream; (ii) pressurizing amine solvent or amine solvent with modifier into the second precipitator at pressure between 50 psi and the critical pressure of amine solvent or amine solvent with modifier through at least one nozzle to form precipitates of brucite from the nearly sulfate-free saline stream; (iii) removing the brucite precipitates from the nearly sulfate-free saline stream by filter to produce brucite slurry; and (iv) removing at least most of the amine solvent or the amine solvent with modifier from the nearly sulfate-free saline stream by stripper to produce nearly sulfate-brucite free saline stream. Producing gypsum boards or materials from gypsum slurry in step (f) by (i) separating gypsum slurry into moist solid gypsum and liquor stream; (ii) removing at least most of the remaining amine solvent or amine solvent with modifier from liquor stream; (iii) recycling liquor stream to the intermediate concentrate; (iv) molding the moist solid gypsum to produce gypsum boards or gypsum materials; and (v) allowing gypsum boards or gypsum materials to dry. Potassium sulfate and calcium chloride are produced from gypsum slurry in step (g) by (i) adding sylvite or sylvinite to gypsum slurry to produce an intermediate liquor stream; (ii) adding an amine solvent or an amine solvent with modifier to the intermediate liquor stream to form precipitates comprising potassium sulfate; (iii) removing precipitates from the intermediate liquor stream; (iv) removing at least most of the amine solvent or the amine solvent with modifier from the intermediate liquor stream; (v) recycling the intermediate liquor stream comprising at least dissolved calcium chloride to the intermediate concentrate; or (vi) recovering the intermediate liquor stream comprising at least calcium chloride brine.

In yet another aspect, the present invention provides a method for separating sulfate from saline water to produce nearly sulfate-free saline stream and inorganic materials. The inventive method comprises the steps of: (a) separating calcium chloride rich produced water from wet oil by hydrophobic membranes; (b) removing sulfate from saline water; (c) injecting nearly sulfate-free saline stream into subterranean formation for hydrocarbons recovery; or (d) feeding nearly sulfate-free saline stream into conventional seawater desalinations plants and auxiliary equipments; or (e) producing de-ionized water from nearly sulfate-free saline stream by membrane distillation; (f) producing gypsum boards or materials from gypsum slurry; or (g) producing potassium sulfate and calcium chloride from gypsum slurry. Sulfate is removed from saline water in step (b) by (i) mixing calcium chloride rich produced water with saline water to allow the concentration of the calcium ion to exceed the concentration of the sulfate ion in saline water to produce intermediate concentrate; (ii) pressurizing the intermediate concentrate into a precipitator at pressure between 50 psi and 1200 psi through at least one injection nozzle to produce a jet stream of the intermediate concentrate; (iii) pressurizing an amine solvent or an amine solvent with modifier into the precipitator at pressure between 50 psi and the critical pressure of the amine solvent or the amine solvent with modifier through at least one injection nozzle to form precipitates of gypsum from the intermediate concentrate; (iv) removing gypsum precipitates from the intermediate concentrate by filtration to produce gypsum slurry; and (iv) removing at least most of the amine solvent or the amine solvent with modifier from the intermediate concentrate by a stripping unit to produce nearly sulfate-free saline stream. Producing gypsum boards or materials from gypsum slurry in step (f) by (i) separating gypsum slurry into moist solid gypsum and liquor stream; (ii) removing at least most of the remaining amine solvent or amine solvent with modifier from liquor stream; (iii) recycling liquor stream to the intermediate concentrate; (iv) molding the moist solid gypsum to produce gypsum boards or gypsum materials; and (v) allowing gypsum boards or gypsum materials to dry. Potassium sulfate and calcium chloride are produced from gypsum slurry in step (g) by (i) adding sylvite or sylvinite to gypsum slurry to produce an intermediate liquor stream; (ii) adding an amine solvent or an amine solvent with modifier to the intermediate liquor stream to form precipitates comprising potassium sulfate; (iii) removing precipitates from the intermediate liquor stream; (iv) removing at least most of the amine solvent or the amine solvent with modifier from the intermediate liquor stream; (v) recycling the intermediate liquor stream comprising at least dissolved calcium chloride to the intermediate concentrate; or (vi) recovering the intermediate liquor stream comprising at least calcium chloride brine.

In yet another aspect, the present invention provides a method for separating sulfate and brucite from saline water to produce nearly sulfate-brucite free saline stream and inorganic materials. The inventive method comprises the steps of: (a) separating calcium chloride rich produced water from wet oil by hydrophobic membranes; (b) removing sulfate from saline water to produce nearly sulfate-free saline stream; (c) removing brucite from the nearly sulfate-free saline stream to produce nearly sulfate-brucite free saline stream; (d) injecting the nearly sulfate-brucite free saline stream into subterranean formation for hydrocarbons recovery; or (e) feeding the nearly sulfate-brucite free saline stream into conventional seawater desalinations plants and auxiliary equipments; or (f) producing de-ionized water from the nearly sulfate-brucite free saline stream by membrane distillation; (g) producing gypsum boards or materials from gypsum slurry; or (h) producing potassium sulfate and calcium chloride from gypsum slurry. Sulfate is removed from saline water in step (b) by (i) mixing calcium chloride rich produced water with saline water to allow the concentration of the calcium ion to exceed the concentration of the sulfate ion in saline water to produce intermediate concentrate; (ii) pressurizing the intermediate concentrate into a precipitator at pressure between 50 psi and 1200 psi through at least one injection nozzle to produce a jet stream of the intermediate concentrate; (iii) pressurizing an amine solvent or an amine solvent with modifier into the precipitator at pressure between 50 psi and the critical pressure of the amine solvent or the amine solvent with modifier through at least one injection nozzle to form precipitates of gypsum from the intermediate concentrate; (iv) removing gypsum precipitates from the intermediate concentrate by filtration to produce gypsum slurry; and (iv) removing at least most of the amine solvent or the amine solvent with modifier from the intermediate concentrate by a stripping unit to produce nearly sulfate-free saline stream. Brucite is removed from the nearly sulfate-free saline stream in step (c) by (i) pressurizing the nearly sulfate-free saline stream into a second precipitator at pressure between 50 psi and 1,200 psi through at least one nozzle to produce a jet stream of the nearly sulfate-free saline stream; (ii) pressurizing amine solvent or amine solvent with modifier into the second precipitator at pressure between 50 psi and the critical pressure of amine solvent or amine solvent with modifier through at least one nozzle to form precipitates of brucite from the nearly sulfate-free saline stream; (iii) removing the brucite precipitates from the nearly sulfate-free saline stream by filter to produce brucite slurry; and (iv) removing at least most of the amine solvent or the amine solvent with modifier from the nearly sulfate-free saline stream by stripper to produce nearly sulfate-brucite free saline stream. Producing gypsum boards or materials from gypsum slurry in step (g) by (i) separating gypsum slurry into moist solid gypsum and liquor stream; (ii) removing at least most of the remaining amine solvent or amine solvent with modifier from liquor stream; (iii) recycling liquor stream to the intermediate concentrate; (iv) molding the moist solid gypsum to produce gypsum boards or gypsum materials; and (v) allowing gypsum boards or gypsum materials to dry. Potassium sulfate and calcium chloride are produced from gypsum slurry in step (h) by (i) adding sylvite or sylvinite to gypsum slurry to produce an intermediate liquor stream; (ii) adding an amine solvent or an amine solvent with modifier to the intermediate liquor stream to form precipitates comprising potassium sulfate; (iii) removing precipitates from the intermediate liquor stream; (iv) removing at least most of the amine solvent or the amine solvent with modifier from the intermediate liquor stream; (v) recycling the intermediate liquor stream comprising at least dissolved calcium chloride to the intermediate concentrate; or (vi) recovering the intermediate liquor stream comprising at least calcium chloride brine.

This invention is of particular interest in connection with applications such as, but not limited to, oil and gas, saline water desalination, mining, geothermal power plants, flue gas desulphurization, gypsum production, coal or oil fired power plants, industrial boilers, cooling towers, treatment of contaminated water sources such as surface or ground water by natural brine or oil-gas fields brine or brine resulting from all kinds of mining operations (sparingly soluble inorganics, toxic metals, lanthanides, actinides, etc.), treatment of natural brine or oil-gas fields brine or brine resulting from all kinds of mining operations to prevent contaminating water sources such as surface or ground water, and other similar operations.

This invention is not restricted to use in connection with one particular application. This invention can be used, in general, for the selective removal of inorganic from aqueous streams with precipitates ranging from macro- to submicron-sizes. Further objects, novel features, and advantages of the present invention will be apparent to those skilled in the art upon examining the accompanying drawings and upon reading the following description of the preferred embodiments, or may be learned by practice of the invention.

DESCRIPTION OF THE PREFERRED EMBODIMENT

The Precipitation Concept

Figure 1:
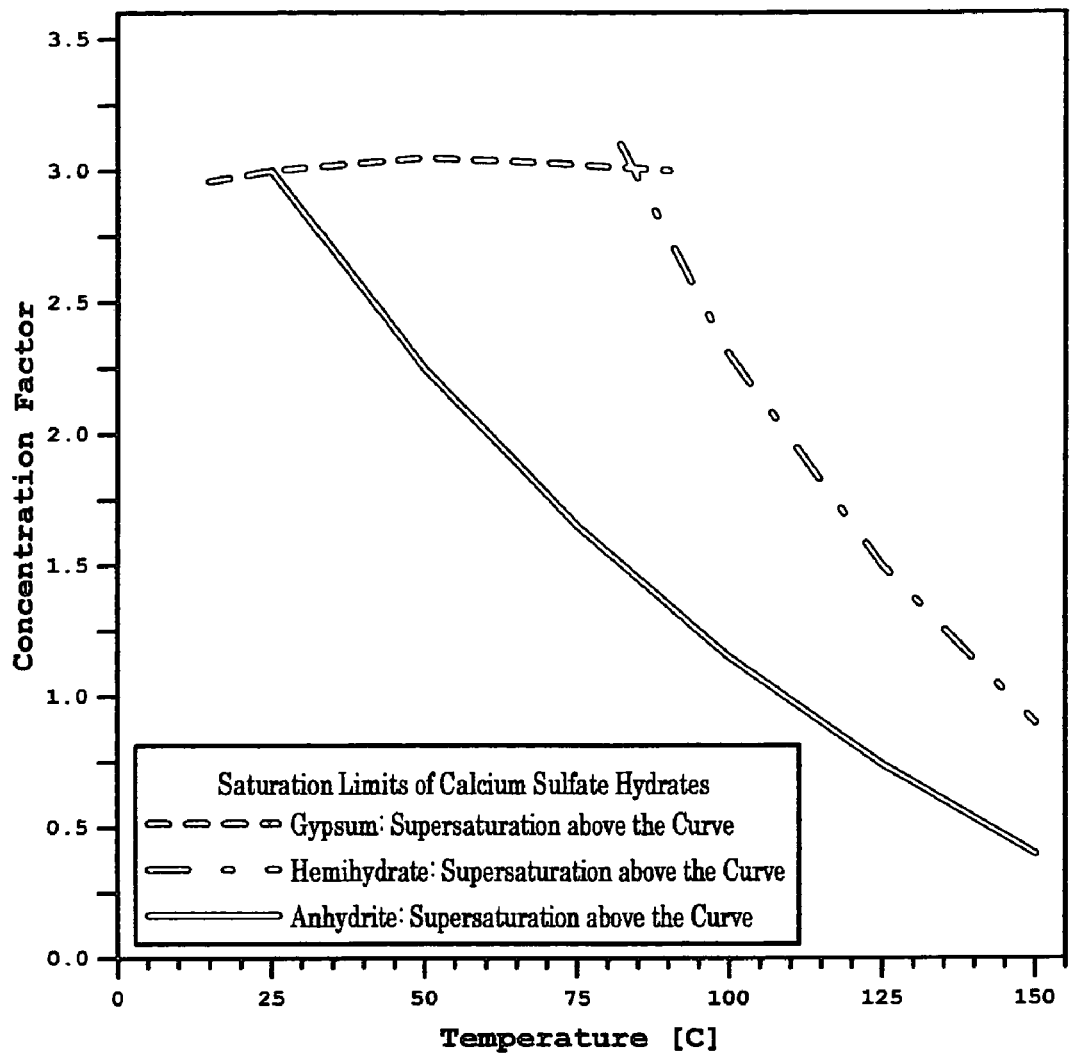
FIG. 1 illustrates concentration factors vs. approximate saturation limits of calcium sulfate hydrates in the Arabian Gulf seawater.
Figure 2:
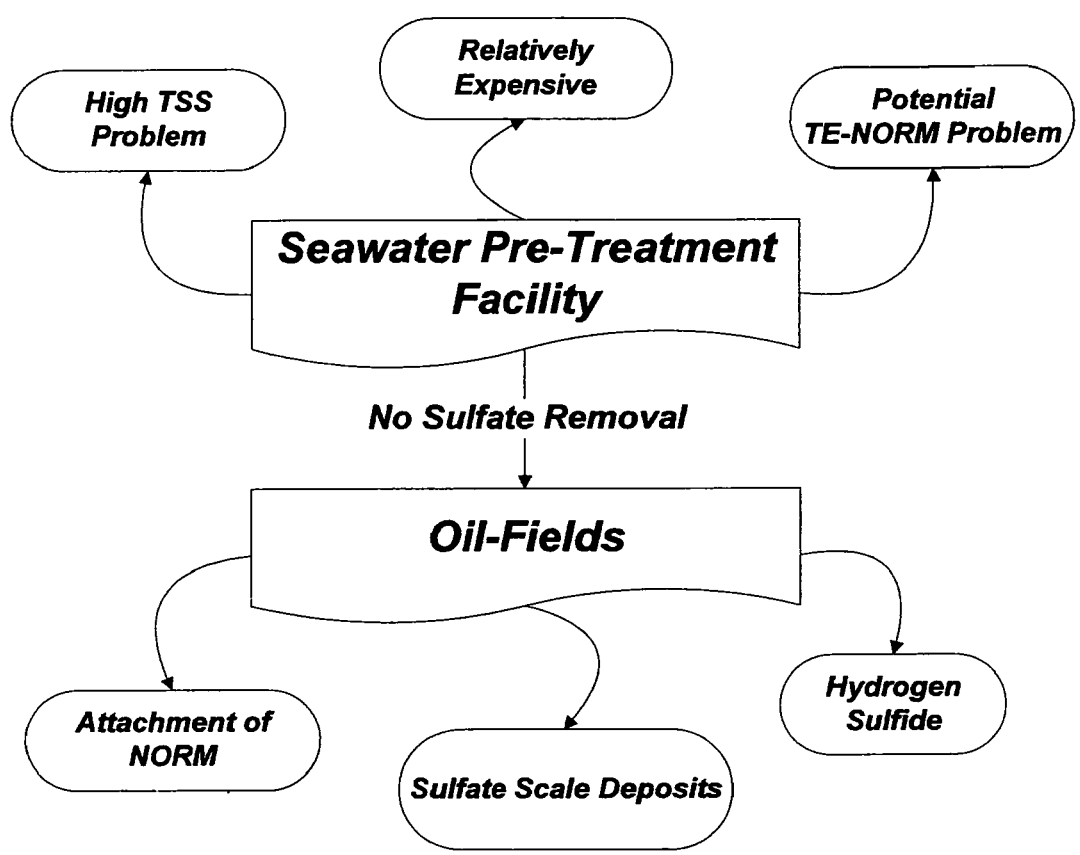
FIG. 2 illustrates problems associated with the on-going oil-fields seawater injection approach.
Figure 3:
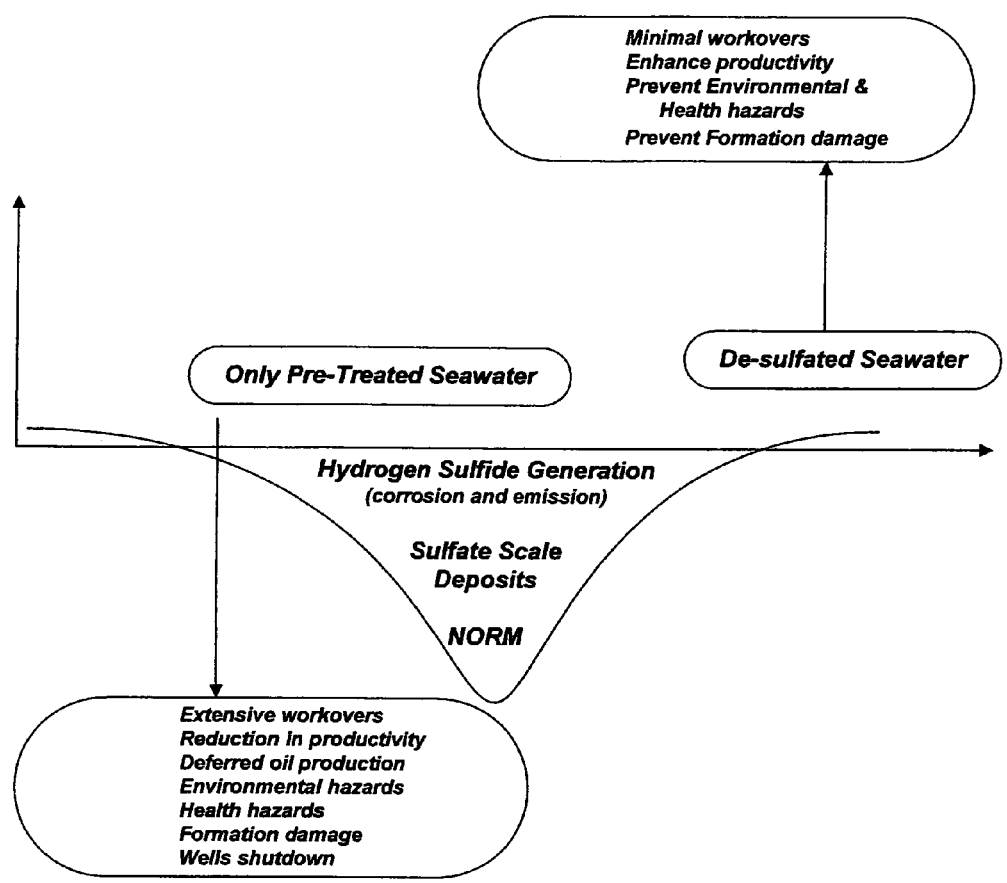
FIG. 3 illustrates the sulfate problems within oil-fields.

I have previously invented the liquid-phase precipitation (LPP) process for the separation of inorganic species from aqueous streams. The effect of the separation in the LPP process is to intermix the aqueous solution with a suitable solvent at ambient temperature and atmospheric pressure to form selective precipitates. The suitable solvents are those which have the capability to meet two basic criteria.

The first criteria is the suitability to precipitate targeted inorganic species from aqueous solutions. The selected organic solvent must be miscible with the aqueous phase. Of equal importance, the targeted inorganic species must be sparingly soluble in the organic solvent. The addition of such a solvent to an inorganic-aqueous solution leads to the capture of part of the water molecules and reduces the solubility of inorganic species in the water which form insoluble precipitates. The solubility of the targeted inorganic species in the organic solvent is a critical factor in achieving the degree of saturation. Therefore, solubility related factors such as the ionic charge, ionic radius, and the presence of a suitable anion in an inorganic-aqueous solution and its effect on the pH rate of change play an important role in affecting and characterizing the formation of precipitates.

The second criteria is suitability for overall process design. For ease of recovery, the selected organic solvent must have favorable physical properties such as low boiling point, high vapor pressure, high relative volatility, and no azeotrope formation with water. From a process design standpoint, the selected solvent must have low toxicity since traces of the organic solvent always remain in the discharge stream. The solvent vapors are also of prime health and environmental concerns. Further, the selected solvent must be chemically stable, compatible with the process, and relatively inexpensive.

Several solvents have been identified for potential use in the LPP process. These solvents are isopropylamine (IPA), ethylamine (EA), propylamine (PA), dipropylamine (DPA), diisopropylamine (DIPA), diethylamine (DEA), and dimethylamine (DMA). However, IPA is the preferred solvent in the LPP process. The preference of IPA is attributed to its high precipitation ability with different basic salts, favorable properties (boiling point: 32.4° C.; vapor pressure: 478 mmHg at 20° C.); and minimal environmental risks. It should be pointed out that IPA salts have been used as a herbicide for agricultural purposes.

There is always, however, an interest in improving the performance of the LPP. Such improvements can be seen in two areas. The first improvement is to reach saturation faster, particularly for inorganic species with an intermediate aqueous solubility limit (more than sparingly soluble species). This would minimize the use of the amine solvent, and reduce the size of processing equipment. The second improvement is to produce controllable precipitates that are more uniformly distributed with high yield, and preferably in micron or sub-micron sizes. To achieve such improvements, the CPP process is invented.

In concept, the CPP is similar to the LPP. That is the targeted inorganic species must be nearly insoluble in the amine solvent, whereas the mother solvent (water), in which the inorganic species is dissolved, is miscible with the amine solvent. However, the difference is that the amine solvent in the CPP is subject to pressure and/or temperature manipulations, and thus the amine solvent exhibits unusual thermo-physical properties such as liquid-like density, higher diffusivity, higher compressibility, and lower viscosity.

The fast diffusion combined with low viscosity of the compressed amine solvent into the inorganic-aqueous phase produces faster supersaturation of the inorganic species and its possible precipitation in the desired micron size. Thus, the particle-size as well as the particle-size distribution, morphology, and crystal structure can be controlled. The achievement of faster supersaturation degree would, in turn, minimize the use of the amine solvent, and maximize the recovery of the amine solvent as well as the removal of the targeted inorganic species.

Several related factors could influence the performance of the CPP process. These factors are: (1) the initial concentration and the mass flow rate of the targeted inorganic species in the saline stream; (2) the injection methods of both the saline stream and the amine solvent into the precipitator unit; and (3) the pressures and temperatures of both the saline stream and the amine solvent as well as the modification of the amine solvent. Followings are a discussion of these factors.

The Targeted Ions and Ion Pairs in a Sample of MSF Brine

As an illustrative example, Table 2 presents the concentration of ions in a sample of MSF brine from a seawater desalination plant. For oil fields saline water injection operation, the sulfate ion must be nearly completely depleted. As such, sulfate is the targeted ion for removal from the MSF brine by the CPP process.

As shown in Table 2, the pH of the MSF brine is abnormally high. This might be attributed to the under "acidification" step in controlling alkaline scale in the seawater feed stream pre-treatment by an acidic solution. The pH of seawater is typically lowered to about 4.0 by acid treatment to convert the dissolved bicarbonate ion into carbon dioxide. Carbon dioxide would then be stripped off by a vacuum deaerator or atmospheric stripping tower. However, the pH of the decarbonated seawater must be re-adjusted to the range of 7-8 by adding a caustic solution to prevent corrosion problems in downstream evaporation equipment. If the "acidification" step was intentionally or ignorantly insufficient (e.g., the pH value is about 5.0 or slightly higher), then the not removed bicarbonate ion from the "under-acidification" step would thermally breakdown in the preheaters into hydroxide ion and carbon dioxide. The release of the hydroxide ion could increase the pH value to greater than 8.0.

It should be pointed that, if any, a very few small seawater desalination plants utilize the "under-acidification" step for the purpose of avoiding the "caustic neutralization" step after the "acidification-decarbonation" steps. If this approach is not tightly and carefully optimized, however, then significant problems would take place including: (1) corrosion problems in downstream equipment if a higher amount of acid than needed is dosed; (2) venting problems in downstream evaporators if a lower amount of acid than needed is dosed (release of carbon dioxide as a noncondensable gas from the breakdown of the remaining bicarbonate ion).

Figure 4:
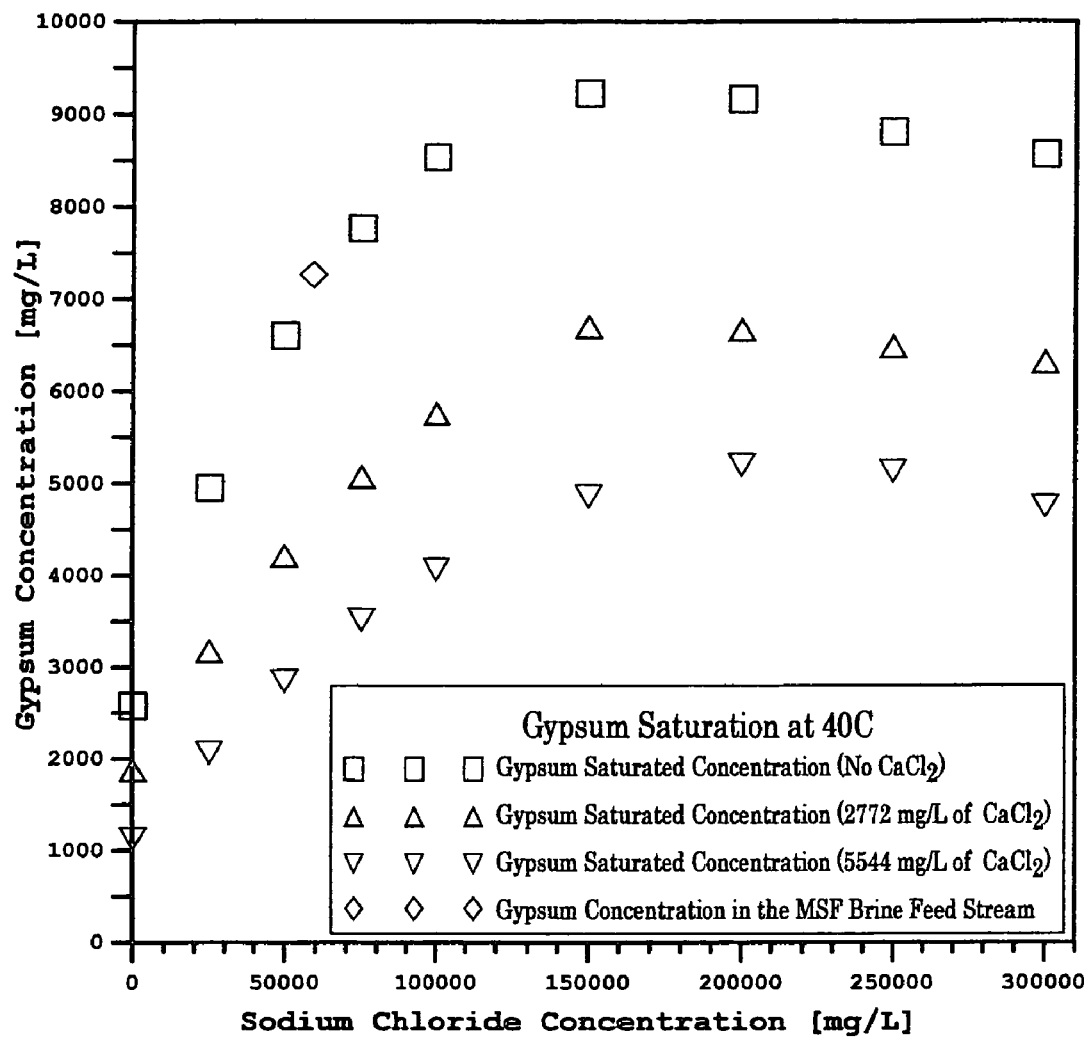
FIG. 4 illustrates the saturation limits of gypsum as a function of sodium chloride concentrations without and with the presence of calcium chloride.

Inspection of the ions concentrations in the MSF brine sample (Table 2) indicates that seawater was concentrated to a certain extent, but short of the point where calcium sulfate scale and magnesium hydroxide scale appear. Table 2 reveals that about 77% of the sulfate ion would possibly pair with the calcium ion. At the discharged temperature (40° C.) of the MSF brine sample, calcium sulfate exists in the form of calcium sulfate dihydrate (gypsum). As shown in FIG. 4, the concentration of gypsum in the MSF brine sample is at saturation.

The concentrations of the sodium and magnesium ions in the MSF brine sample are significant. A small portion of the sodium ion and/or the magnesium ion (if the pH is near neutral) could pair with the unbalanced and small portion (23%) of the sulfate ion. Based on the material balance, however, it appears that all of the sodium ion would pair with the chloride ion. The existence of the unbalanced and small portion of the sulfate ion as a neutral or free ion or as a neutral pair species with either magnesium or sodium could also be a possibility. Unfortunately, analytical methods such as Ion Chromatography, Atomic Absorption, ICP and Trimetric do not distinguish between neutral ions, neutral ion pairs, and ion pairs.

For oil-fields saline water injection operations, for instance, the target is not only the removal of sulfate scale prone species (gypsum) but rather the near whole concentration of the sulfate ion. Therefore, to nearly completely deplete the sulfate ion from the MSF brine by the CPP process using a small and economical amount of a precipitation solvent, the unbalanced portion of the sulfate ion should be matched or slightly exceeded by a sparingly soluble cation such as calcium.

The magnesium ion in the MSF brine sample is nearly pairing with the hydroxide ion to form magnesium hydroxide (brucite). Brucite, as a sparingly soluble species, can also be co-precipitated with gypsum. This is due to the presence of an excess of hydroxide ions from using an amine solvent as a precipitation agent. However, the selected amine solvents for the CPP process are weak bases, which do not furnish the hydroxide ion directly by dissociation. In addition, the volume of the selected amine solvent in the CPP is expected to be extremely low compared to the volume of the MSF brine. Thus, the pH of the mixed stream (the amine solvent and the MSF brine) is the key to allow significant or insignificant precipitation of brucite.

As shown in Table 2, it is imperative to note that there is a significant seasonal variation in the salinity (sodium chloride), pH, temperature, and most importantly in the concentration of the calcium ion of the MSF brine. In the summer time in which the demand for fresh water is extremely high, MSF plants are operated at the adapted "top brine" temperature (110° C.). This would lead to a possibly noticeable: (1) decrease in the concentration of the calcium ion in the MSF brine stream due to the precipitation of calcium sulfate (in the forms of anhydrite and hemihydrate) within the MSF equipment; and (2) increase in the salinity and temperature of the MSF brine. The opposite situation takes place during winter time when the MSF plants operated below their designed "top brine" temperature. It is worth noting that seawater contains a small concentration of the strontium ion (about 7 mg/L; Table 1) that typically pairs with the sulfate ion as a sparingly soluble cation. Table 2, however, reveals that MSF brine is free of the strontium due to its precipitation within the MSF equipment.

FIG. 4 also shows that the solubility limits of gypsum increase with increasing sodium chloride concentration, reach a maximum, and then decline at very high concentrations of sodium chloride. As such, a decrease in the calcium ion concentration combines with an increase in sodium chloride concentration in the MSF brine stream could mean that gypsum concentration is appreciably below its solubility limit. On the other hand, increasing salinity not only means increasing the concentration of sodium chloride but also equally increasing the concentrations of other background ions in the MSF brine including sulfate. The solubility limit is fundamentally true only when the stream is stoichiometrically balanced. That is, for instance, when the number of the calcium ions equals the number of the sulfate ions in a given concentration of sodium chloride. If an excess of either ion (anion or cation) is introduced (in this case more sulfate), the solubility will be depressed due to the common ion effect. Interactions between various ions could thus become more complicated and the gypsum concentration relative to its solubility limit may not be visualized or estimated by a simple subtractive or additive material balance, but rather by actual and tedious experimental tests.

Unlike natural seawater in which ions concentrations are fixed around the year, there are considerable differences in ions concentrations in the processed MSF brine streams. Differences in ions concentrations due to seasonal operations in MSF plants are, to some degree, predictable while differences due to operational problems within MSF plants are impossible to anticipate. As is the case with any given technology, however, the CPP process is stream's specific and since the treatment of the MSF demands near complete removal of the sulfate ion; the CPP technology is inherently sensitive to concentration variations in the MSF brine and might require adjustment in the amount of the amine solvent.

Jet Injection Methods

Various jet injection devices such as coaxial nozzles, spray nozzles, vibrating orifices or nozzles, premixed nozzles and others can be used in applying the CPP technology. Although the effectiveness of the CPP process lies mainly in the ability of the amine solvents as a function of manipulating pressure, temperature, and other operating variables, the efficiency of the injection device (contact between the amine solvent and saline water) is of equal importance. If the nucleation (precipitate formation) and condensation (precipitate growth) mechanisms are fast enough, then precipitates will reach a high degree of supersaturation in a very short period of time and within the precipitator vessel. This would allow appreciable reduction in the size of the precipitator vessel. A significantly high degree of supersaturation, however, leads to smaller precipitates.

A possible jet injection method that can be used in the CPP process is a concentric nozzle. In such a nozzle, the MSF brine stream flows through the inner tube while the amine solvent flows through the coaxial annulus. Therefore, the main mechanism of the jet hydrodynamic mixing is that the MSF brine draws in compressed amine fluid from the surrounding mass of such a fluid. The smaller the nozzle diameters are the higher the inlet velocities of the compressed fluids. This provides a more efficient micro-mixing. The highest nucleation of precipitates will take place at the border of the jet stream (region of contact). However, the highest condensation of precipitates will take place at the center of the jet stream due to the high turbulence impact and higher ions concentrations in the center of the jet.

A second possible injection method that can also be employed in the CPP process is that the compressed amine and the MSF brine stream are injected into the precipitator vessel via two separate spray nozzles. If the velocities of the injected fluids are not equal, then fast and/or a significantly high degree of supersaturation may not be achieved. Therefore, the induction and condensation periods for precipitates will be longer. This could affect the design of the precipitator vessel (the need for a larger instead of a smaller precipitator vessel, further mixing devices such as a stirred precipitator vessel, precipitates seeding step, etc.). However, a moderate degree of supersaturation leads to larger precipitates.

A third possible injection method is to use a mixing twin-fluid nozzle to co-introduce and pre-mix the MSF brine with the amine solvent before entering the precipitation vessel. This provides a simple and efficient injection method for intensive mass-transfer and fast nucleation of the targeted species.

Underestimation of the injection and mixing step between the MSF brine and the amine solvent may lead to ineffective and incorrect design and scale up of the CPP process. For instance, in addition to the effective removal of gypsum (as well as brucite if desirable) by CPP as prerequisite for de-sulfating the MSF brine, is the recovery of gypsum as a valuable commodity. Gypsum precipitates should preferably form uniform micron-size precipitates for effective dewatering and utilizing as a viable raw material for other applications. The quality of dewatering the precipitated gypsum is directly affected by the uniformity and size distribution of gypsum precipitates. Good dewatering will reduce the free moisture of the gypsum cake, an important factor in manufacturing gypsum wallboards, for example.

Effect of Pressure, Temperature, and Amine Modifiers

Table 3 indicates that the selected amine solvents have relatively low critical pressures, and moderate critical temperatures. As the carbon number of the selected amine solvents increases, critical pressures decrease while critical temperatures (as well as boiling temperatures) increase. When the CPP is used as an enabling rather than a standalone process in conjunction with, for instance, pressure-driven membrane processes such as Nanofiltration (NF) or Reverse Osmosis (RO), the pressure of NF or RO concentrate stream would typically range, respectively, between 550 and 1,150 psi. One of the economical approaches is to conduct CPP within the critical pressure of the selected amine solvent. The critical pressures of the selected amine solvents vary between about 440 psi (DPA) and 1,090 psi (MA), which are within the pressure limits of NF or RO concentrate stream.

The critical temperatures of the selected amine solvents lie within the desired intermediate thermal region (127-327° C. or 400-600K), a thermal region that permits the stabilization of the kinetic phase rather than the thermodynamic phase. The temperatures range of the MSF brine is above ambient (40-55° C.). Hence, it is economically preferable to operate CPP process at the brine stream's temperature for the selective removal of sulfate. This can be achieved by either using a compressed amine solvent at sub-critical temperature, or by matching the compressed amine solvent with an appropriate modifier to achieve mainly a lower critical temperature while maintaining the polarity, basicity, miscibility, and precipitating ability of the compressed amine in the targeted saline stream.

Molecules containing a hydrogen atom bonded to nitrogen, or oxygen, or fluorine form a strong dipole-dipole interaction and hydrogen bonding. Primary amines that are selected for the CPP process undergo hydrogen bonding. Thus, such amines are polar solvents and completely miscible in water. However, they are less polar than alcohols. This stems from the fact that the N—HN hydrogen bond between amine molecules is weaker than the O—HO hydrogen bond because nitrogen is less electronegative than oxygen, which results in low boiling points of primary amines.

Nitrogen ($N_2$) can form compounds with only three covalent bonds to other atoms. A molecule of amine contains $sp^3$-hybridized nitrogen atom bonded to one or more carbon atoms. The nitrogen has one orbital filled with a pair of unshared valence electrons, which allows these compounds to act as bases. Amines are therefore weak bases that could undergo reversible reactions with water or other weak acids. However, when an amine reacts with a strong acid, the unshared electrons of the amine are used to form sigma bond with the acid, which drives the reaction to completion (irreversibly).

Nitrous oxide ($N_2O$) or $N_2$ can thus be possible modifiers for the selected amine solvents since they are both miscible in amine solvents. $N_2O$ is a nontoxic low polarity fluid with favorable critical properties (almost similar to $CO_2$ except it has a permanent dipole moment). However, $N_2$ is an inert non-polar fluid with a very low critical temperature ($-147°$ C. or 126.2 K) and a moderate critical pressure (490.8 psi or 33.4 atm) that is close to the critical pressures of the selected amine solvents. $N_2$ could potentially provide a critical temperature for a mixture of $N_2$ and a selected amine solvent that lies proximate to ambient temperature.

Since $N_2O$ and $N_2$ are sparingly miscible in water, however, the chosen modifier must be premixed and completely homogenized with the amine solvent before injection into the targeted saline stream. As such, the proportion of $N_2O$ or $N_2$ to the amine solvent ought to be carefully optimized to prevent any negative effects on the desired properties of the amine solvent in water.

It is worth noting that $CO_2$ as a modifier in the sense of strictly forming a homogeneous single phase with the selected amine solvents is a mismatch. This is attributed to the reactivity of primary amines with the acidic compressed $CO_2$ to form split phases with variable solubility. However, the interaction of compressed $CO_2$ with a saline water would lead to reduce the pH value, which would result in converting the bicarbonate ion into carbonic acid.

The acidity of $CO_2$ in saline water along with its non-homogeneity with primary amines can be advantageously employed in applying the CPP process to control alkaline scale, and more importantly sulfate scale, in the pre-treatment step of seawater to allow desalination plants (MSF, MED, RO and the like) to operate to their maximum limit rather than to be controlled by the sulfate scale boundary limits. This would also replace the typical cumbersome "acidification" and "caustic neutralization" steps in seawater pre-treatment of desalination plants.

De-Sulfation of Brine Streams from Seawater Desalination Plants by CPP for Oil-Fields Saline Water Injection Operations CPP can be employed as a standalone setup that is capable of selectively removing the sulfate ion from, for instance, MSF brine and the like, for oil-fields saline water injection operations. The primary objective of CPP is to effectively deplete the sulfate ion from the MSF brine. The second objective is the overall economic attractiveness of the CPP technology that lies within the optimum and minimum use of the precipitation solvent as well as the purity of the precipitated (recovered) salts as salable by-products to offset the cost of the technology. The third objective is to provide an environmentally benign (zero discharge) technology by efficiently utilizing a waste stream from a nearby seawater desalination plants and by simultaneously preventing (or at least minimizing) the generation of a new waste (e.g., sludge) from the processed original waste stream.

Several possible approaches can be employed in conducting the CPP process. A particular processing approach to conduct the CPP process, however, is based on using a single-stage CPP with seeding.

There is a deficiency in amount of the calcium ion to completely pair with the sulfate ion in brine streams from seawater desalination plants or seawater. To substantially force out the sulfate ion from brine streams or seawater, a significant amount of a precipitation solvent or multiple CPP stages are thus required. This might diminish the economic attractiveness of the CPP technology. Alternatively, if the unbalanced and small portion of the sulfate ion in brine streams or seawater is matched or exceeded with sparingly soluble alkaline cations such as calcium; and/or the solubility limit of gypsum in the CPP feed stream is significantly depressed, then the removal of the sulfate ion would be substantial. The addition of calcium chloride as a seeding agent into the CPP feed stream (whether its brine or seawater) would meet these double objectives of matching the unbalanced portion of the sulfate ion and depressing the solubility limit of gypsum before conducting the CPP process.

The benefits of the seeding step with calcium chloride are demonstrated in two factors. First, FIG. 4 indicates that the solubility limit of gypsum is depressed by about 38% upon the addition of 50 meq./L of calcium chloride; and by about 56% upon the addition of 100 meq./L calcium chloride due to the common ion effect (calcium). Second, the addition of 50 meq./L (or a higher amount) of calcium chloride allows the concentration of the calcium ion to slightly exceed the concentration of the sulfate ion in brine streams from seawater desalination plants or seawater.

Two main sources for calcium chloride can be utilized to fulfill the seeding step in the CPP process. The first one is based adding the needed amount of calcium chloride to the brine feed stream from an external source. The second one is based on recycling the precipitated gypsum from the CPP process to its feed stream, as an internal source, in the form of calcium chloride.

Rock formations of most oil fields or deep aquifers water in the Arabian Gulf area are carbonate-based (e.g., calcite or dolomite or magnesite). Such formation waters are therefore chloride rich that contain high concentration of the calcium ion. Table 1, for example, reveals that formation (aquifers) waters are indeed chloride-rich that contain high concentration of both the sodium and calcium ions.

The current average water cut in most wet oil gathering centers (GCs) in the Arabian Gulf area are between 22 and 58%. The estimated average oil-fields produced water (calcium chloride rich) from a given GC is between 28,000 and 53,000 barrels per day (BPD). Such a daily production of unwanted produced water would provide a suitable external source of calcium chloride to seed brine streams from seawater desalination plants (or seawater) for effective de-sulfation by CPP.

For instance, if the total daily consumption of an oil producer is 500,000 barrels of de-sulfated MSF brine for its oil fields saline water injection operations, then 5-10% of the total consumption volume can be supplied by unwanted oil fields produced water (25,000 to 50,000 BPD) from probably one "wet oil GC" to add about 50 to 100 meq./L of the calcium ion to the MSF brine feed stream. However, if "calcium chloride rich" aquifers water is available or accessible, then it will preferably be used instead of oil-fields produced water (free of oil content). Table 4, for example, presents ions material balance between the MSF brine feed stream (475,000 BPD) and the required volume of "calcium chloride rich" formation water (25,000 BPD) to satisfy the calcium ion seeding step in the CPP process.

On the other hand, an internal source of calcium chloride for the CPP seeding step can also be achieved by reacting the precipitated amount of gypsum (50 meq./L) by the CPP process with an equivalent amount of potassium chloride (sylvite) in the presence of an amine solvent to precipitate potassium sulfate and produce aqueous calcium chloride as follows:

$$CaSO_4 2H_2O + 2KCl \Leftrightarrow K_2SO_4 \downarrow + CaCl_2 + 2H_2O \qquad (1)$$

The resulted calcium chloride will be recycled to the feed stream of the CPP process to complete the de-sulfation of the brine stream. The significant advantages of this internal seeding approach are the: (1) production of a self-sustained source of calcium chloride to efficiently operate the CPP process; and (2) co-production of potassium sulfate that is commercially much more valuable as a commodity than gypsum.

The high value of potassium sulfate stems mainly from its highly demanded use as a potash fertilizer for crops, particularly crops that are sensitive to chloride. In an arid area, where farmers use brackish water for irrigation that in some areas ruined soil fertility, the potash fertilizer would be ideal for improving the deteriorated soil quality and consequently crop yields by combating the effect of sodium chloride.

The conversion of gypsum as given in Eq. (1) must be carefully conducted to complete the reaction and thus to prevent low production of potassium sulfate due to the possible co-generation of double salts (e.g., syngenite: $K_2SO_4 \cdot CaSO_4 H_2O$). The reaction as given in Eq. (1) also requires a significant amount of high grade potassium chloride (a relatively expensive commodity). However, potassium chloride (sylvite) in Eq. (1) can be replaced by sylvinite as follows:

$$CaSO_4 2H_2O + 2KCl.X\ NaCl \Leftrightarrow K_2SO_4 \downarrow + CaCl_2 + XNaCl + 2H_2O \qquad (2)$$

Sylvinite is one of the abundant low-value by-products from, for instance, oil-fields produced water or aquifers water.

Figure 5:
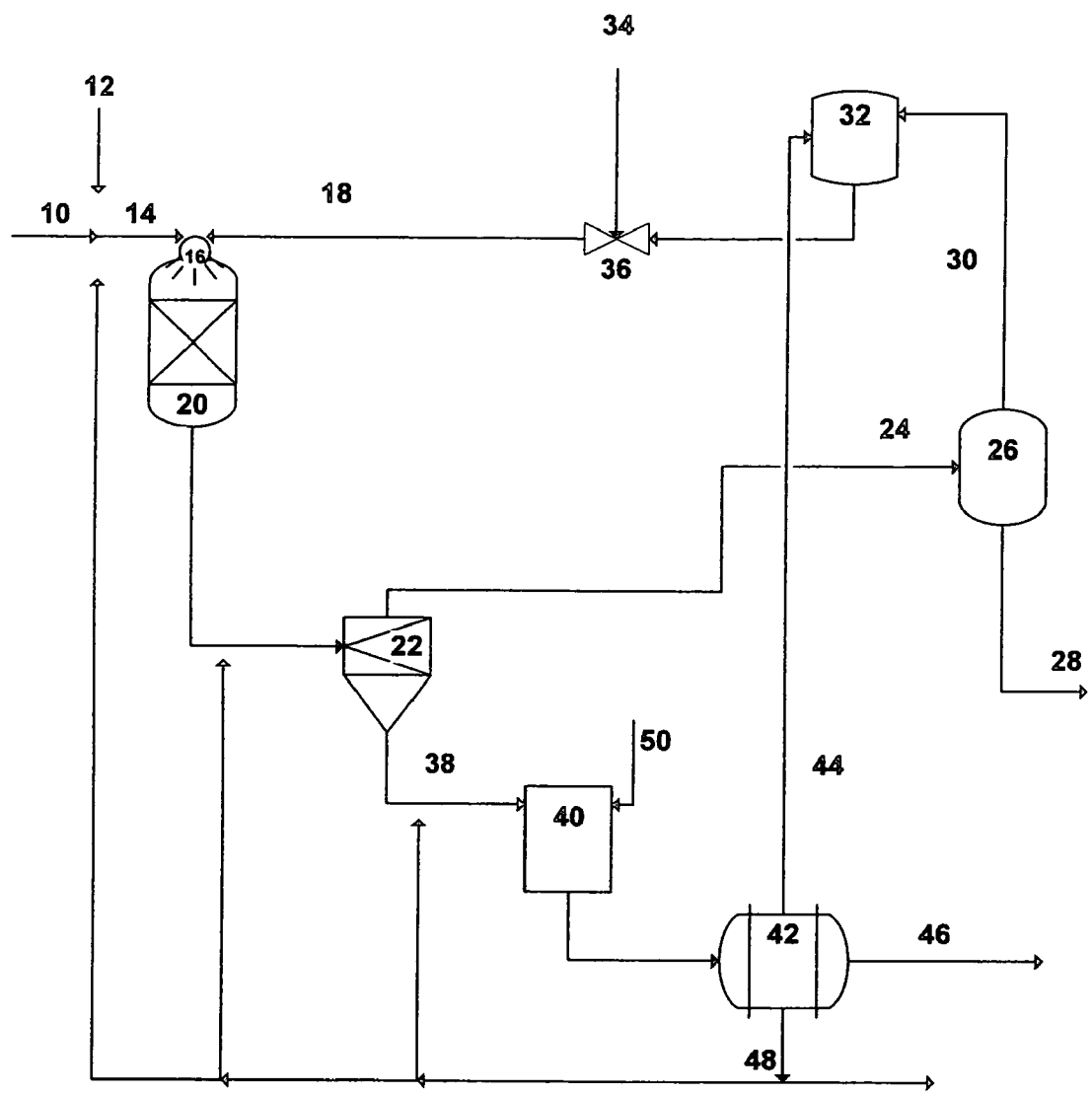
FIG. 5 illustrates a possible flow diagram for the Compressed-Phase Precipitation (CPP) process in a single-stage.

Reference is now made to FIG. 5, which depicts a simplified possible flow diagram illustrating the de-sulfation of MSF brine stream by a single-stage CPP process with external seeding. A brine stream from a seawater desalination plant [10] will be premixed with a sufficient amount of "calcium chloride rich" formation water [12] to allow the concentration of the calcium ion to exceed the concentration of the sulfate ion in the mixed saline stream [14]. The mixed saline stream [14] will then delivered to the precipitator unit [20] preferably via the inner tube of at least one concentric nozzle [16]. The pressure of such a mixed saline stream is between 50 and 1,200 psi. A selected amine solvent will be delivered [18] into the precipitator unit [20] at a pressure ranging between 50 psi and the critical pressure of the amine solvent preferably through the coaxial annulus of the same concentric nozzle.

It should be pointed out that: (1) multiple stages of precipitator units instead of a single-stage precipitator unit can also be implemented as needed; (2) multiple concentric nozzles can also be installed within a single precipitator unit; (3) the amine solvent and the mixed saline stream can also be injected into the precipitator unit via two separate spray nozzles; and (4) a mixing twin-fluid nozzle to co-inject the amine solvent and the mixed saline stream before entering the precipitator unit.

The outlet stream from the precipitator unit [20] will be fed into a thickener-stage of hydrocyclones [22] to separate the formed precipitates (mainly gypsum) from the stream. The over flow stream [24] of the hydrocyclones [22] that contains the nearly de-sulfated mixed saline stream and the amine solvent will be fed into a vapor-liquid equilibrium based stripping unit [26] to separate the nearly de-sulfated mixed saline stream [28] from the amine solvent [30]. The stripping unit could be a flash drum, a vacuum or a standard distillation tower, a vacuum membrane distillation unit, or a pervaporation unit. The recovered amine solvent will be recycled to the solvent storage tank [32]. The nearly de-sulfated saline water [28] will be used in oil-fields water injection operations.

If required, the amine solvent can also be mixed with $N_2$ or $N_2O$ [34] in a mixer [36] to mainly reduce the critical temperature of the amine solvent. In the case of modifying an amine solvent, the miscible binary mixture of the selected amine solvent and its modifier ($N_2$ or $N_2O$) [18] instead of a pure amine solvent will be pressurized into the precipitator unit [20] via the coaxial annulus of the concentric nozzle [16] to contact the mixed saline stream [14] that will be pressurized separately via the inner tube of the same concentric nozzle [16].

Gypsum precipitates in the hydrocyclones under flow [38] will be transferred into a thickener tank [40] to further thicken gypsum precipitates ahead of the final gypsum filter [42]. In addition to thicken gypsum precipitates, the thickener tank [40] can also be used to provide a buffer storage capacity, and/or to allow the recovery of any remaining amine solvent from the hydrocyclones under flow stream [38]. The gypsum slurry from thickener tank [40] will be dewatered by a vacuum filter [42] (final filter). The preference of using a vacuum filter instead of a press filter or a centrifugal filter, is also to recover any remaining amine solvent [44].

The dewatered gypsum [46] can then be poured into a mold (not shown in FIG. 5) to gain full strength. Mold shapes can vary depending on the configuration of the desired final gypsum products (wallboards or as raw materials for other applications). For example, the gypsum molding step can be selected from a host of geometrical shapes such as rectangular, planar, spherical, cylindrical, conical, trapezoidal, cuboid, and the like. The aqueous liquor stream [48] from the final gypsum filter [42] will be recycled either to the feed stream of the thickener tank [40], or to the feed stream of the hydrocyclones thickener-stage [22], or to the mixed saline stream [14].

The thickener tank [40] can also be designed as a low- or as a high-pressure precipitator to react gypsum slurry with potassium chloride (sylvite) or sylvinite [50] in the presence of an amine solvent to produce potassium sulfate and calcium chloride as given in Eq. (1) or Eq. (2). The precipitated potassium sulfate will then be dewatered by a vacuum filter [42], and the recovered amine solvent [44] will be recycled into the amine solvent storage tank [32]. The produced potassium sulfate [46] can be used as a potash fertilizer for crops that are sensitive to chloride.

The aqueous liquor stream [48] from the final potassium sulfate filter [42] that contains the calcium chloride slurry (Eq. 1 or 2) can partially be recycled to the mixed saline stream [14] to enhance the concentration of the calcium ion (further increase the saturation degree of gypsum before entering the precipitator unit [20]) or recovered as a valuable commodity.

Figure 6:
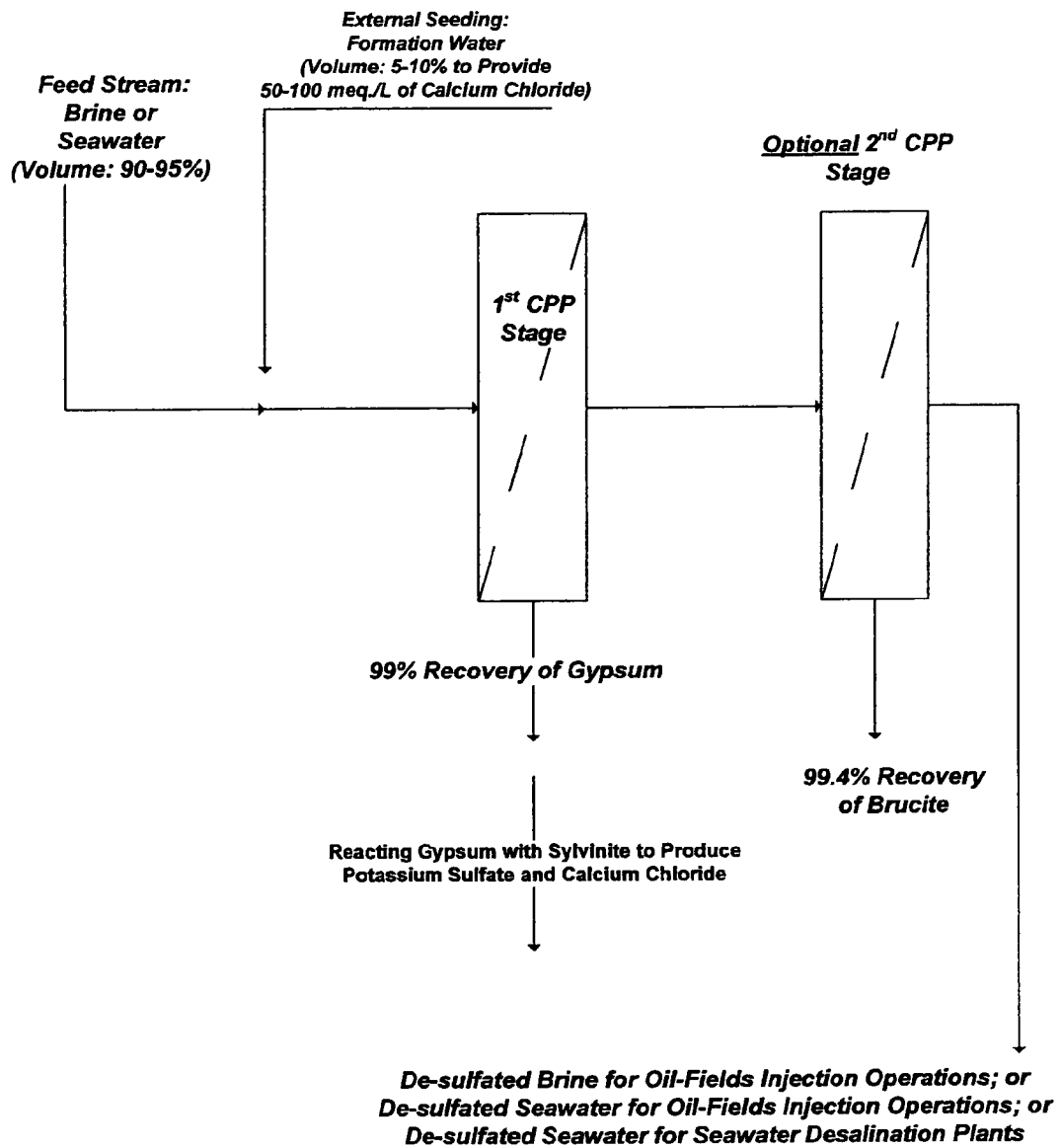
FIG. 6 illustrates an oversimplified flow diagram for the CPP process in a dual-stage.

If the recovery of brucite (magnesium hydroxide) is also desirable for a strictly commercial purpose, then an optional second CPP stage can be added. FIG. 6 shows the general arrangement of the dual-stage CPP for the de-sulfation of brine streams and production of brucite. It is worth noting that brucite is one the purest product of the CPP process. Thus, the production of brucite is strongly recommended for several reasons; among them is the control of air pollution.

For instance, power-water co-generation plants in the Arabian Gulf region are the chief source of air pollutants ($CO_2$, $SO_2$ and $NO_2$). A single MSF plant emits over 1,300 tons of $CO_2$ per day. In fact, it's the practice in the Arabian Gulf region to allow gas turbines to exhaust directly to atmosphere (by-passing dampers and stacks) for the purpose of slightly increasing the turbines' output. In the light of the imposed health hazards of such an enormous pollutants emission and their contribution to global warming along with the potential tax that could be imposed on greenhouse gases at a suggested level between $25 and $85 per ton (the possible revival of the Kyoto agreement or an alternative new agreement), a new direction in treating rather than freely emitting such harmful gases could be enforced. The circulating fluid bed scrubbing is a possible method in which brucite (as a reagent) can be used to control air pollution as follows:

$$CO_2 + Mg(OH)_2 \rightarrow MgCO_3 + H_2O \quad (3)$$

$$SO_2 + Mg(OH)_2 \rightarrow MgSO_3 + H_2O \quad (4)$$

$$SO_2 + MgSO_3 + H_2O \rightarrow Mg(HSO_3)_2 \quad (5)$$

$$NO_2 + 2MgSO_3 \rightarrow 2MgSO_4 + \tfrac{1}{2}N_2 \quad (6)$$

De-Sulfation of Seawater to Improve the Efficiency of Desalination Plants

The implementation of a very expensive new generation of hybrid seawater desalination plants is currently taking place to presumably solve the current and future water-power demands by providing a better match between water and power loads, and lower cost. Although the implementations of well optimized hybrid plants are a must, they remain limited because they do not resolve the key critical obstacle in desalting seawater that causes enormous engineering difficulties and hinders the production of low cost water. That is the selective removal of sulfate scale in the forms of alkaline cations from seawater feed stream, which directly controls the recovery ratio of any seawater desalting plant and sulfate scale related maintenance costs. The sulfate scale problem is obvious, yet the solutions are either devious or dubious.

If an effective and inexpensive technology is implemented to sufficiently de-sulfate seawater feed stream, then seawater desalination plants can be efficiently operated without any sulfate scale impairment. For instance, thermal driven seawater desalination plants such as MSF can be operated to their maximum designed "top brine" temperatures range (140-150° C.), instead of their current operational temperatures range (90-110° C.) that is forcibly imposed by the calcium sulfate scale envelope (FIG. 1). This would allow the production of potable water to be at least tripled by effectively lifting the pre-imposed sulfate scale design limitation on the maximum potable water production. In addition, it entirely eliminates the sulfate scale related maintenance costs within the desalination equipment. Furthermore, it relieves concerned countries from allocating a significant portion of their budgets to build new seawater desalination plants at sky rocketing costs.

The CPP process (as given in the processing steps of FIG. 5) can be integrated within pre-treatment setups of any seawater desalination plants to efficiently de-sulfate seawater. Table 5, for example, reveals ions material balance between seawater (475,000 BPD) and the required volume of "calcium chloride rich" aquifers water or oil-fields produced water (25,000 BPD) to satisfy the calcium ion seeding in the CPP process.

It should be pointed out that brucite can also be selectively removed from seawater (FIG. 6). The removal of sulfate along with brucite would make the pre-treated seawater feed stream free of any scale tenacious species (sulfate and alkalinity scale species).

It should also be pointed out vacuum deaerators or stripping towers that are typically used in seawater desalination plants to strip off the generated carbon dioxide from the acidification step (the breakdown of the bicarbonate ion in seawater to carbon dioxide and water by an acid) can concurrently be used to strip off the amine solvent from the de-sulfated seawater stream (e.g., eliminate the need for unit [26] in FIG. 5). Since carbon dioxide is a noncondensable gas and nearly insoluble in the selected amine solvents for the CPP process, the stripped off amine solvent and carbon dioxide by the vacuum deaerator or the stripping towers can be separated by condensing the amine solvent. The condensed amine solvent can then be recycled to the CPP process.

Integration of the Precipitation Concept with the Hydrophobic Membranes Concept

Figure 7:
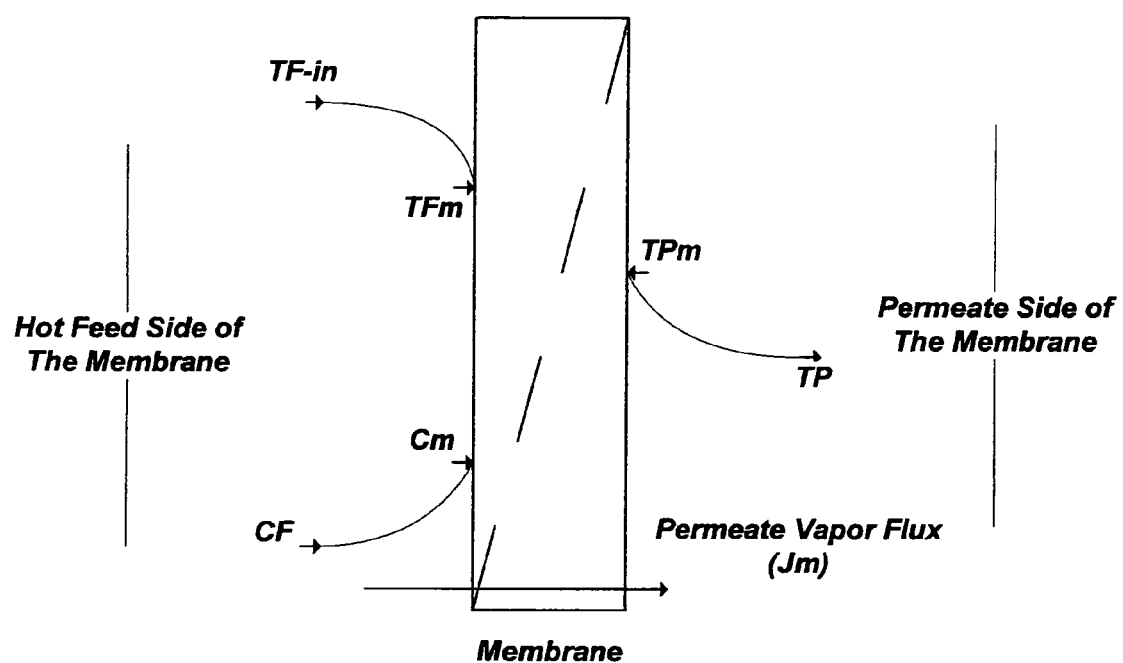
FIG. 7 illustrates a simplified schematic diagram for the flow direction and the polarization of temperature and concentration in Membrane Distillation (MD).

Membrane Distillation (MD), for instance, refers to the transport of the vapor phase through pores of a hydrophobic membrane that separates two liquid solutions. The liquid solutions cannot enter the membrane pores unless the applied pressure is greater than the specified "capillary or liquid entry" pressure for the porous partition of a given membrane. In the absence of such a pressure, vapor-liquid interfaces are formed on both sides of the membrane pores due to surface tension forces. Under these conditions, if a temperature difference is applied, a vapor pressure gradient will be created on both interfaces. Evaporation will take place at the hot membrane interface (feed), water vapor will transport through the membrane pores with a convective and/or diffusion mechanism, and vapor condensation will take place at the cold side of the membrane interface (permeate). Thus, the net permeate vapor flux will be from the hot feed stream to the cold condensate stream. FIG. 7 shows a simplified schematic diagram for the flow direction in MD.

MD has several clear advantages compared to conventional pressure-driven membranes (e.g., RO) or thermal-driven (e.g., MSF, MED and the like) processes. First, MD can take place at a very low pressure that is slightly above atmospheric pressure (e.g., 15 psi), which is contrary to RO that ought to be operated at high pressures (e.g., 1, 100-1200 psi) to exceed the natural osmotic pressure of saline streams such as seawater (for instance, RO is inapplicable to MSF brine streams due to their high osmotic pressures) and to achieve the required recovery. High pressure requirements to drive RO demand significant power consumption in contrast to MD.

Second, MD can be conducted at temperatures that are significantly lower than the boiling point of water (e.g., 40-70° C.). Any form of waste heat (e.g., existing low temperature gradients typically available in processing plants, hot oil-fields produced water) or low grade energy sources (wind or solar or geothermal or solar ponds) can be used. For example, the inherited thermal energy within the MSF stream (40-55° C.) is ideal for employing MD.

Third, the MD product stream from any saline streams including the MSF brine that contain non-volatile ions is an ultra-pure. Entrainment of dissolved ions in the product stream, as in the case with RO (or NF), is avoided. For an oil producer, the MD product stream would be ideally suited for applications such as enhanced oil recovery (EOR) by stream injection.

Fourth, the evaporation surface of MD can be made similar to the available various pressure-driven membrane modules (e.g., hollow fiber, spiral wound, etc.). The modularity of MD thus allows the ease of adding processing capacity as needed. The natures of bulky conventional thermal-driven processes (MSF, MED, and the like) prohibit furnishing the flexibility and simplicity that MD provides.

The apparent simplicity of MD, however, obscures complex and simultaneous mass and heat transfer interactions. The mass water vapor flux in MD is a function of the "membrane permeability coefficient" ($K_m$) and the vapor pressure difference across the membrane:

$$J_m = K_m [p_{Fm}^s(T_{Fm}) - p_p] \quad (7)$$

where $p_{Fm}^s$ is the saturated vapor pressure of the hot feed stream at the membrane surface temperature ($T_{Fm}$) rather than the bulk (inlet) feed temperature ($T_F$), and $p_p$ is the permeate stream pressure. $K_m$ is a function of the membrane structure such as porosity ($\epsilon$), pore size radius (r), thickness ($\delta$), and tortuosity ($\chi$):

$$K_m = \frac{2\varepsilon r}{3\chi \delta} \frac{1}{RT} \sqrt{\frac{8RT}{\pi}} \quad (8)$$

$T_{Fm}$, as the driving force for the water vapor flux across the membrane, not only affects the vapor-liquid equilibrium in the feed stream but also affects the hydrodynamics in the feed stream liquid phase since its dependent on salts concentrations at the membrane surface.

As water evaporation in MD takes place, the viscosity of a saline feed stream increases with increasing salts concentrations. This would elevate the osmotic pressure, depress the vapor pressure, and alter heat and mass transfer coefficients across the membrane boundary layers. The saturated vapor pressure of a saline stream can be related to its osmotic pressure as follows:

$$P_{Fm}^s = \frac{p^\circ}{\exp\left[\frac{\Pi_{Fm} \tilde{v}_w}{RT_{Fm}}\right]} \quad (9)$$

where at $T_{Fm}$, $p_{Fm}^s$ is the saturated vapor pressure of a saline stream (mmHg), $p^\circ$ is the vapor pressure of pure water (mmHg), $\Pi_{Fm}$ is the osmotic pressure of a saline stream (psi), $\tilde{v}_w$ is the water molar volume (L/gmol), and R is the ideal gas constant (L psi/gmol K).

$p^\circ$ can be accurately estimated using Antoine equation. The osmotic pressure ($\Pi_{Fm}$) of a saline stream can be estimated as follows:

$$\Pi = 1.19 T_{Fm} \Sigma M_i \quad (10)$$

where $M_i$ is the molar concentration of individual ions (mol/L).

Eqs. (7) to (9) imply that in order to enhance or achieve an acceptable level of the water vapor flux, the value of either $K_m$ or $T_{Fm}$ or both values must be increased. As given in Eq. (8), the membrane structure is the key to optimize $K_m$. The $K_m$ value of hydrophobic membranes is typically very low (e.g., about 0.21 Kg/m²·hr·mmHg) to prevent water in the liquid phase from passing through the membrane pores. A slight increase in the $K_m$ value is possible, which could drastically improve water vapor flux, but it should not be at the expense of the loosing membrane hydrophobicity. As such, a balance ought to be strike between improving the value of $K_m$ and maintaining the membrane hydrophobicity.

$K_m$ is also, to some degree, temperature dependent (decreases by 3% with a 10° C. increase in the mean temperature). The molecular mean free path for water vapor at 60° C. is about 0.3 µm. If convective transport is dominant across the membrane, the controlling factor will be the membrane pore size. If diffusive transport is dominant, however, the controlling factor will be the average mole fraction of air present within the membrane pores. Using inappropriate small membrane pore size combined with an increase in the feed stream temperature range (e.g., above 60° C.) could subsequently lead to an unintended reduction in $K_m$.

The key in increasing the value $T_{Fm}$ lies within: (1) the type of the condensation method on the permeate side of the membrane; (2) the characteristics of the membrane module and flow regime along with operating conditions including the feed stream temperature and flow rate, and the permeate stream pressure; and (3) controlling the solubility limits of inorganic salts in the saline feed stream, particularly the sparingly soluble salts that bare scale prone species.

The Permeate Water Vapor Condensation Method

The thermal mechanism in the MD hot feed stream takes place in two forms. The first form is the latent heat which is utilized to evaporate water at the feed side (hot) of the membrane interface while the second form is the conductive heat that is lost in transferring water vapor through the membrane layer to the permeate side (cold) of the membrane interface. For effective MD, the extent of the conductive heat loss must be minimized.

Figure 8:
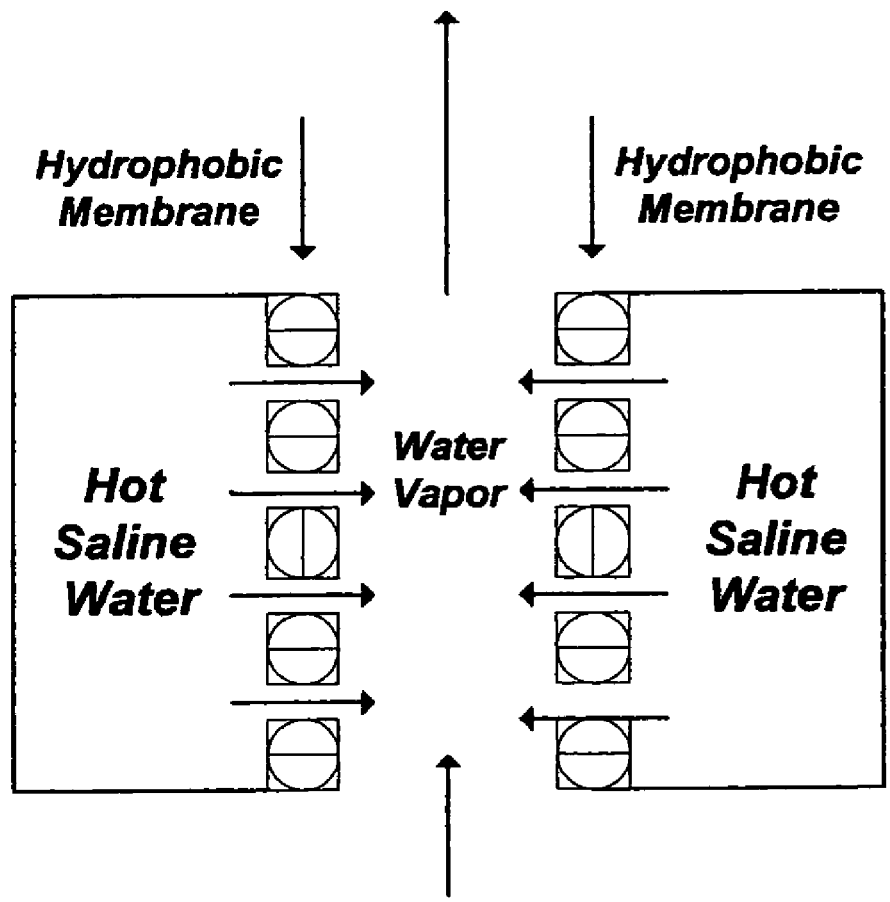
FIG. 8 illustrates the MD Internal condensation method.

The permeate vapor condensation step can be accomplished internally (within the membrane module) or externally outside the membrane module. As shown in FIG. 8, one of the methods to conduct the internal condensation is by directly contacting a potable water stream at ambient temperature (e.g., 20° C.) along the permeate surface of the hydrophobic membrane to condense water vapor. Since the water vapor pressure of the potable water stream at the condensation-membrane interface (the cold side of the membrane 20° C.) is much lower than the vapor pressure of the hot water feed stream steam at the evaporation-membrane interface, water vapor is transferred from the hot stream through the membrane pores to the flowing cold potable water stream. However, the extent of the conductive heat loss in this "Direct Contact Membrane distillation" (DCMD) method is considerable.

Figure 9:
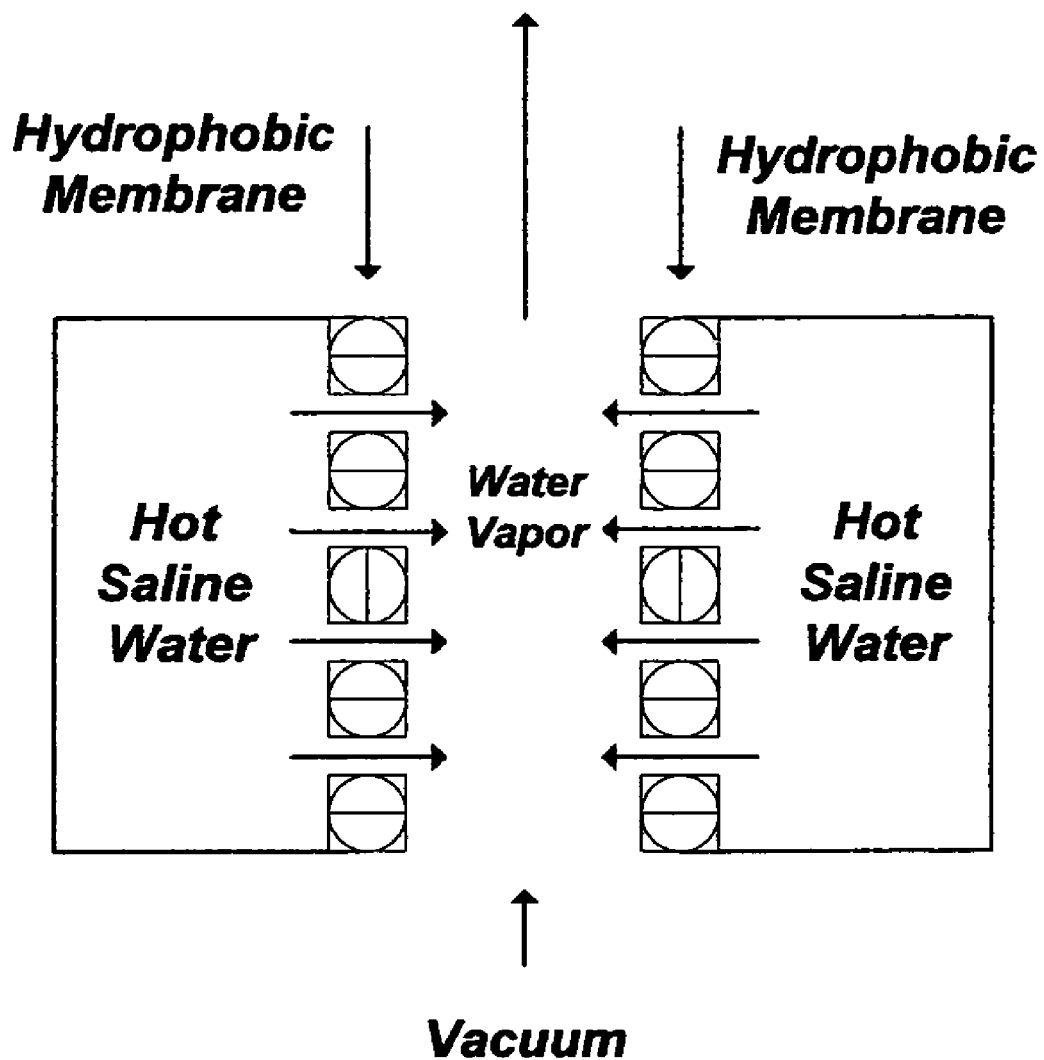
FIG. 9 illustrates the MD external condensation method.

As shown in FIG. 9, however, an external condensation method can be achieved by vacuum to withdraw the water vapor from the hot-side of the membrane interface and condense it in an external condenser outside the membrane module. In this "Vacuum Membrane Distillation (VMD) method, and when vapor-liquid equilibrium is favorable, the potential for drastically achieving higher water flux and substantially minimizing the extent of conductive heat loss from hot feed stream is attainable.

Operating Conditions

One of the major advantages of VMD relative to DCMD is that the conductive heat transfer across the membrane layer is nearly negligible. This is attributed to the applied vacuum that allows a very low gas pressure on the permeate side of the membrane and prevents the presence of trapped air in the membrane pores (e.g., reduces resistance to vapor flow). As such, the heat flux ($J_h$) at the hot feed stream side of the membrane interface can be expressed as follows:

$$J_h = K_h[T_{F\text{-}in} - T_{Fm}] \quad (11)$$

where $K_h$ is the "membrane heat transfer coefficient" that can be estimated from the Nusselt number, and $T_{F\text{-}in}$ is the inlet hot feed stream temperature entering the membrane module. Since the value of $T_{Fm}$ can not practically be determined, $J_h$ can be related to the practically measurable temperature drop between the inlet and outlet of the hot feed stream through the membrane module as follows:

$$J_h = \frac{Q_f}{A_m} c_p [T_{F\text{-}in} - T_{F\text{-}out}] \quad (12)$$

where $Q_F$ is the hot feed stream flow rate, $A_m$ is the total membrane area, $c_p$ is the liquid phase heat capacity, and $T_{F\text{-}out}$ is the feed stream temperature leaving the membrane module. Knowing the value of $J_h$ from Eq. (12) along with roughly estimating the value of $K_h$ from the appropriate Nusselt number, the hot feed stream at the membrane surface temperature ($T_{Fm}$), which is responsible for the temperature polarization phenomenon, can be predicted.

The heat flux is related to the mass water vapor flux as follows:

$$J_h = J_m \Delta H \quad (13)$$

where $\Delta H$ is the water heat of vaporization. For laminar flow, it is fundamentally known that $K_h$ in cross flow configuration (e.g., saline stream flows in the shell side of the hollow fiber module and vacuum in the tube side) is much higher than its correspondent value in parallel flow configuration (e.g., saline stream flows in the tube side of the hollow fiber module and vacuum in the shell side). Thus, the cross flow configuration in MD is essential to achieve higher permeate water vapor flux.

According to Eq. (12), both feed stream flow rate and temperature have substantial effects on the permeate water vapor flux. At a given inlet feed stream temperature, increasing the feed stream flow rate would increase both $K_h$ and $T_{Fm}$. Another benefit for applying a high feed flow rate is to significantly reduce the residence time of the hot feed stream passing through the membrane module, and thus increase the outlet feed stream temperature. This is an important source of heat efficiency, for instance, in the actual design of multi-stage VMD.

De-Sulfation and De-Ionization of Saline Streams by the CPP-MD Process

In order for MD to be effective, its hydrophobic membrane pores should not be wetted by water or blocked by salts precipitation. However, if sparingly soluble salts are allowed to be near or exceed their solubility limits in the hot feed stream, then such salts would precipitate on the membrane pores mouths, and thus they not only facilitate pathways for moisture intrusion through the membrane pores, but also block the pores and cease the water vapor flux across the membrane.

The concentrations of calcium sulfate and magnesium hydroxide in, for instance, the highlighted sample of MSF brine (Table 2) are either at the saturation limit or near saturation. Although MD is a thermal-driven technology, however, gypsum would be the main occurring form of calcium sulfate within the targeted operating temperature range (e.g., 40-70° C.). This is due to the fact that gypsum dominantly forms below 70° C. with about 60° C. transition temperature to the other forms of the calcium sulfate hydrates (anhydrite and hemihydrate).

CPP can be used to effectively remove sparingly soluble alkaline scale including gypsum and brucite from seawater desalination plants brine streams or from seawater before applying MD. If CPP is used to completely deplete gypsum (as given the processing steps of FIG. 5) and brucite (as generally shown in FIG. 6), then the treated brine stream or seawater will be nearly completely dominated with sodium chloride. This would allow the operation of MD in a complete scale-free manner to produce de-ionized water and sodium chloride. CPP is thus an essential enabling processing step that directly contributes to the productivity of MD.

Figure 10:
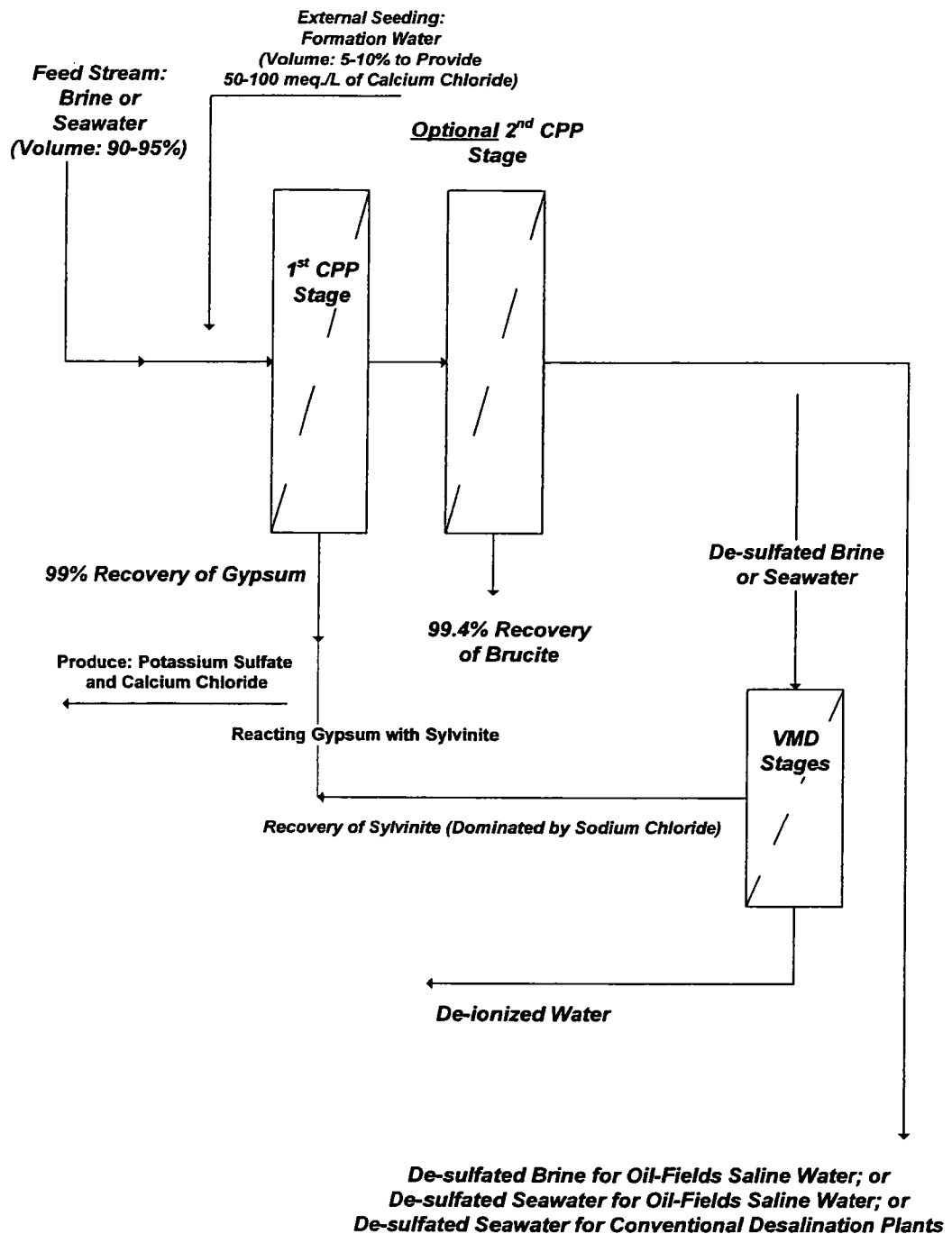
FIG. 10 illustrates the integrated CPP-MD process to produce de-sulfated saline water, de-ionized water, and salts.

FIG. 10 shows an oversimplified flow diagram for the integration of CPP with MD in which: (1) CPP mainly produces de-sulfated brine for oil fields injection operation and gypsum; or de-sulfated seawater for seawater desalination plants or oil fields injection operation; and (2) MD produces de-ionized water and sylvinite from the CPP de-sulfated brine or seawater. The recovered sylvinite (sodium and potassium chloride salt that is dominated by sodium chloride) from MD as a free salt can be used to convert the recovered gypsum from CPP step to highly demanded salts (potassium sulfate and calcium chloride).

The CPP-MD process would thus not only meet the twin ultimate objectives of any potable water producers or oil producers (the production of de-sulfated brine or de-sulfated seawater and de-ionized water) but also the recovery of profitable salts in a well integrated (technically, economically and environmentally) processing setup.

The temperature of MSF brine varies between 40 and 55° C. MD vapor permeate flux (e.g., VMD) is practically acceptable at 55° C. (11 to 17 Kg/m² hr) and highly acceptable at 70° C. (32 to 41 Kg/m²·hr) even near the saturation limit of sodium chloride (about 400,000 mg/L). This means that VMD is capable of recovering 82.5% of de-ionized water from its feed stream while the remaining 17.5% is produced as mainly saturated sodium chloride salt. In the case of applying VMD at 55° C., however, a larger total membrane area is required, which would increase its capital cost.

Figure 11:
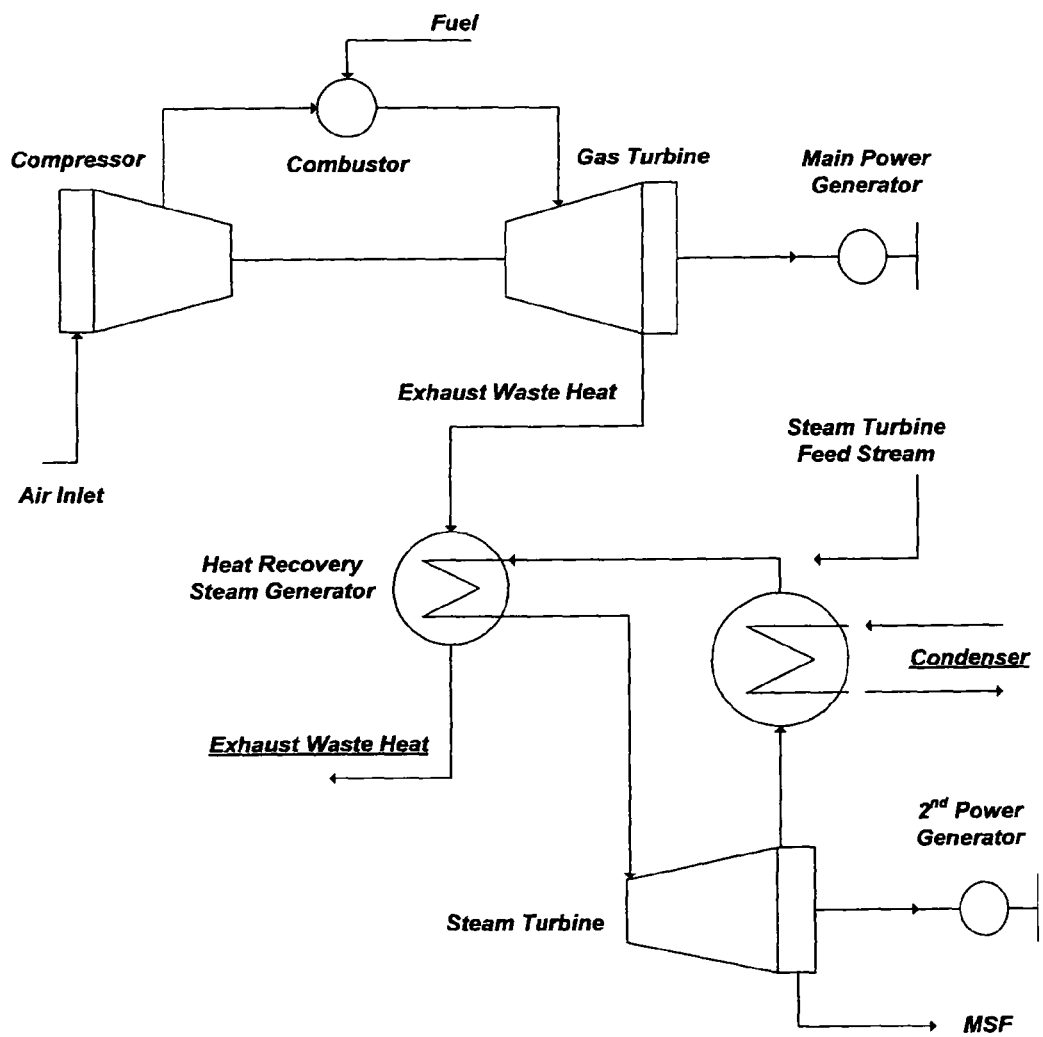
FIG. 11 illustrates possible sources of waste heat within power-water co-generation plants.

Sufficient and free sources of waste heat, however, typically exist within any thermal-driven seawater desalination plants. For instance, waste heat can be extracted from the exhaust of at least two possible sources without interfering with the functionality of the MSF plant. As shown in FIG. 11, these sources include, but not limited to, either the exhaust of the: (1) "Heat Recovery Steam Generators" (HRSG); and/or (2) steam turbines (if the MSF plant is fitted with a combined-cycle of fuel-steam turbines instead of a single-cycle fuel turbines). The cooling water systems to cool of steam turbines exit streams, generators, and other plant auxiliaries are also possible options for waste heat extraction.

If such free sources of waste heat are utilized on site to provide the needed low grade thermal energy, as they should be, then the capital cost will be substantially reduced by operating VMD at the desired 70° C. feed temperature and thus reducing the required total membrane area. In addition, the operating cost of VMD will be mainly limited to the mechanical energy in the forms of the feed flow circulation and the permeate stream vacuum. Thus, the energy consumption will most likely be within 1.3 kW·hr/m³ (0.2 kW·hr/B). It is worth noting that the specific equivalent work consumption in MSF seawater desalination plants is 20 kW·hr/m³ whereas in RO is 5-10 kW·hr/m³. This is a considerable advantage that reflects the clear economic viability of VMD in desalting hyper-saline streams such as reject brine compared to MSF or RO in desalting seawater taking into account the fact that the salinity of seawater is about 10-times less than the salinity of the brine stream at its saturation limit of sodium chloride.

Recovery of Formation Water from Wet Oil as a Seeding Stream for the CPP Process As water cut continues to increase in aging oil wells, the "oil field" could become the "water field". Thus, costs incurred in processing wet oil, disposing of the separated water from oil, and meeting environmental regulations become difficult to justify. When such costs exceed oil revenues, then water could ultimately force the abandonment of the field, particularly in multiple low production oil fields, in which large scale wet oil handling facilities are not available or not justifiable.

However, the CPP process allows the use of such unwanted oil-fields produced water from producing wells in its seeding step of the calcium ion to de-sulfate brine streams from seawater desalination plants or seawater. The CPP process would thus serve as an immediate and appropriate disposal path for such produced water.

Crude oil and water are immiscible liquids and "hydrophobic" membranes are water repellent. Crude oil (the continuous liquid phase when the water cut is below 50%) can be driven through the hydrophobic membrane by the application of a very low trans-membrane pressure while water (the dispersed liquid phase) is repelled by the membrane hydrophobicity.

Therefore, the integration of CPP and hydrophobic membranes concepts would meet the double objectives of allowing on line de-watering of wet oil by hydrophobic membranes as well as directly utilizing (rather than accumulating) the unwanted oil-fields produced water by CPP.

Hydrophobic membranes do not permit passage of liquid water through their pores until water "capillary" ("liquid entry"; $p_c$) pressure of the membrane is exceeded. $p_c$ depends on the interfacial tension, contact angle, and the pore size distribution of the membrane as reflected by the following relation:

$$p_c = \frac{2\tau_{w-o}\cos\theta_{w-o}}{r} \quad (14)$$

where $\tau_{w-o}$ is the water-oil interfacial tension, $\theta_{w-o}$ is the contact angle of a water droplet on the membrane surface in the presence of oil, r is the radius of the membrane pore.

Figure 12:
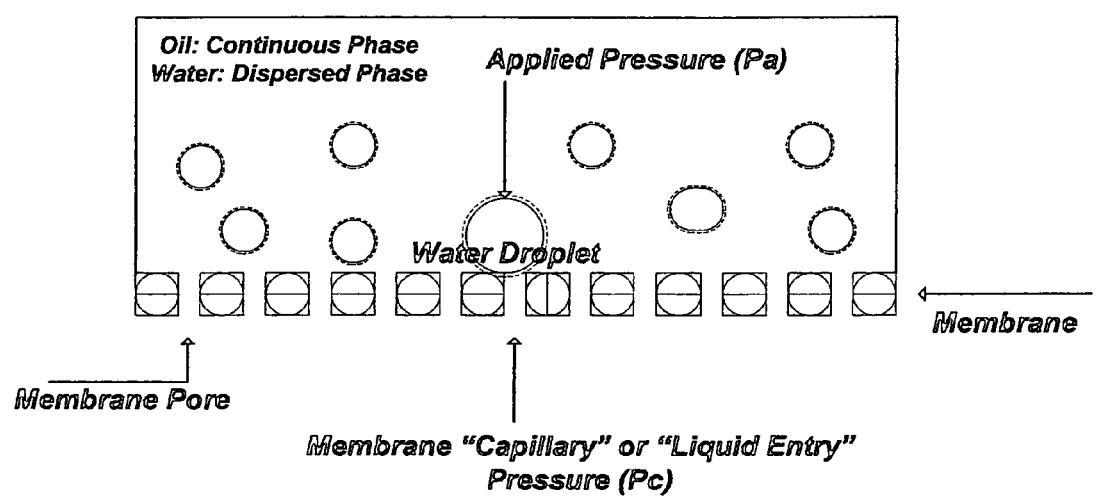
FIG. 12 illustrates the concept of water droplet repellent by the capillary pressure of hydrophobic membranes.

The value of the $\theta_{w-o}$ can be related to various interfacial tensions as follows:

$$\cos\theta_{w-o} = \frac{\tau_{m-w} - \tau_{m-o}}{\tau_{w-o}} \quad (15)$$

where $\tau_{m-w}$ is interfacial tension of a membrane in contact with water, and $\tau_{m-o}$ is the interfacial tension of the same membrane in contact with oil. If $\tau_{m-w}$ is greater than $\tau_{m-o}$, then the membrane is hydrophobic ($0<\theta_{w-o}<90°$). This means that the value of $p_c$ is very low, and thus the membrane is oil wet that permits the passage of oil and repels water. If, however, $\tau_{m-w}$ is lower than $\tau_{m-o}$, then the membrane is hydrophilic ($\theta_{w-o}>90°$). This means that the value of $p_c$ is negative, and the membrane is water wet that permits the passage of water and prevents oil from entering the membrane structure against the applied pressure ($p_a$). FIG. 12 demonstrates the concept of water droplets repellent by the capillary pressure of a hydrophobic membrane.

Whether the membrane is hydrophobic or hydrophilic, when $p_a$ exceeds $p_c$ of the targeted dispersed phase droplets (water droplets in the case of water-oil emulsion; or oil droplets in the case of oil-water emulsion), and the membrane pores are smaller than the droplets size of the dispersed phase, then dispersed phase droplets will deform to pass through the membrane pores. This fundamental issue can also be applied to demulsify concentrate or dilute water-oil or oil-water emulsions.

My testing of both polymer and ceramic hydrophobic membranes with different pore sizes reveals that "capillary" pressure ($p_c$) for the oil phase (oil-air) is less than 1 psi while $p_c$ for the water phase (water-air) is between 20 and 30 psi. As such, hydrophobic membranes allow the permeation of oil at near zero pressure and repel water.

Figure 13:
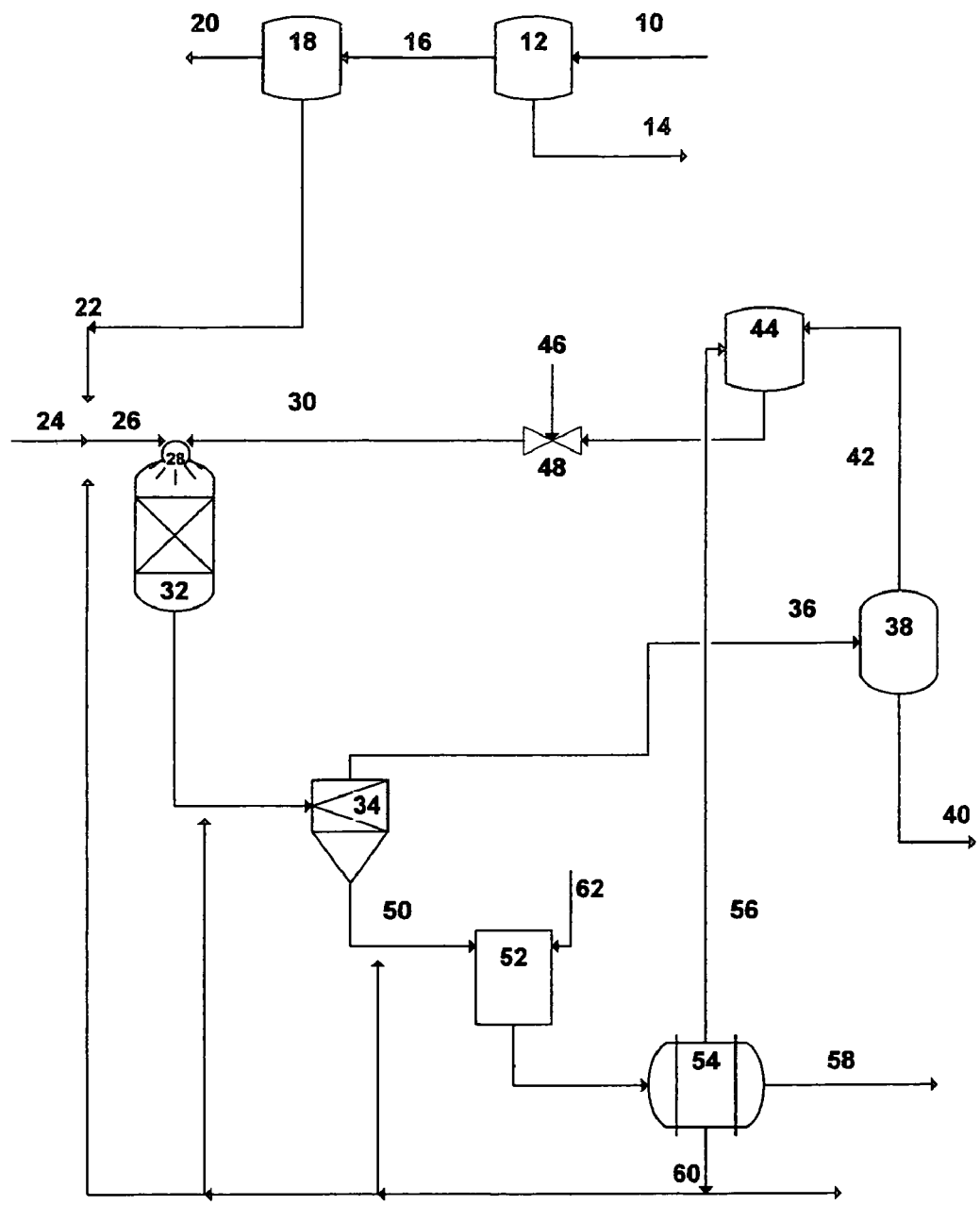
FIG. 13 illustrates a possible flow diagram for the separation of produced water from wet oil in conjunction with the CPP process in a single-stage.

Reference is now made to FIG. 13, which shows the dewatering of wet oil. Wet oil stream [10] will be delivered at pressures higher than the capillary pressures of both oil and water phases to the first stage of hydrophobic membranes [12] to remove emulsion-coated suspended solids (silt, clay, salt, scale, trace metals, etc.) [14] and to demulsify water droplets (membranes act as coalescers). As mentioned earlier, the concept of membrane coalescer is only useful if the applied pressure ($p_a$) is higher than the capillary pressure ($p_c$), and the pore size of the membrane is smaller than the size of water droplets. At such conditions, both the continuous phase (oil) and the dispersed phase (water) are driven through the hydrophobic membrane while the suspended solids are retained at the membrane surface by the sieving mechanism Since liquid droplets are deformable, water droplets will be deformed to pass through the membrane pores which would result in the disruption of water droplets. Such a disruption should lead to enlarge water droplets and release their dissolved salt contents as they flow out of the membrane pores.

As shown in FIG. 13, the pretreated wet oil [16] will then be delivered to the second stage of hydrophobic membranes [18] to segregate oil in a near pure form [20] from formation water [22]. The applied pressure ($p_a$) in this stage will be below the capillary pressure of water ($p_c$) so that hydrophobic membranes repel water and allow only the passage of oil as a product stream.

It should be pointed out that if the oil content in the recovered formation water [22] is required not to exceed 40 mg/L, then a polishing stage of ultra-porous hydrophilic membranes can be added (not shown in FIG. 13). The hydrophilic membranes would allow the passage of water (in this case the continuous phase) through the membrane as a product stream and the rejection of the oil content (the dispersed phase).

The recovered "calcium chloride rich" formation water [22] from wet oil will then be diverted to the CPP process as a calcium ion seeding stream to de-sulfate brine streams from seawater desalination plants or seawater. The processing steps [22-62] in FIG. 13 are identical to the previously described processing steps [10-50] in FIG. 5.

TABLE 1

Ions Concentrations in Seawater and Samples of Sulfate-Rich Natural Brine and Calcium Chloride Rich Formation Water.

| Ion | Seawater (mg/L) | Sulfate-Rich Natural Brine* (mg/L) | Formation Water (mg/L) |
|---|---|---|---|
| Cations | | | |
| $Na^+$ | 12,170 | 11,990 | 74,770 |
| $K^+$ | 420 | 93 | 3,290 |
| $Mg^{+2}$ | 1,530 | 190 | 3,490 |
| $Ca^{+2}$ | 540 | 498 | 22,570 |
| $Sr^{+2}$ | 7 | 28 | 590 |
| Anions | | | |
| $Cl^-$ | 24,000 | 17,970 | 168,500 |
| $HCO_3^-$ | 140 | 20 | 250 |
| $SO_4^{-2}$ | 3,100 | 3,045 | 320 |

*Most ions concentrations (e.g., calcium and sulfate) in sulfate-rich natural brine and seawater are nearly identical

TABLE 2

Ions Concentrations in Brine Samples from Multi-Stage Flash (MSF) Seawater Desalination Plants.

| Ion | Brine Sample (mg/L) | Brine Variations (Min./Max.) (mg/L) |
|---|---|---|
| Cations: | | |
| $Na^+$ | 23,240 | 21,800/23,620 |
| $K^+$ | 740 | 670/830 |
| $Mg^{+2}$ | 2,890 | 1,880/3000 |
| $Ca^{+2}$ | 1,750 | 1260/1810 |
| Anions: | | |
| $Cl^-$ | 40,650 | 33,600/41,700 |
| $HCO_3^-$ | 160 | 160/180 |
| $SO_4^{-2}$ | 5,430 | 4,300/6,200 |
| pH | 8.7 | 7.8/9.1 |
| Temperature (° C.) | 40 | 40/55 |

Min.: Minimum; Max.: Maximum

TABLE 3

Properties of the Selected Pure Fluids.

| Fluid | $T_b$ K | $T_C$ K | $p_C$ atm (psi) | $V_C$ mL/mol | ω | DP (debye) |
|---|---|---|---|---|---|---|
| $N_2$ | 77.4 | 126.2 | 33.4 (490.8) | 89.9 | 0.039 | 0.0 |
| $N_2O$ | 184.7 | 309.6 | 71.5 (1050.8) | 97.4 | 0.165 | 0.2 |
| $CO_2$ | | 304.1 | 72.8 (1069.9) | 93.9 | 0.239 | 0.0 |
| MA ($CH_5N$) | 266.8 | 430.0 | 74.3 (1091.9) | | 0.292 | 1.3 |
| DMA ($C_2H_7N$) | 280.0 | 437.7 | 53.1 (780.4) | | 0.302 | 1.0 |
| EA ($C_2H_7N$) | 289.7 | 456.4 | 55.7 (818.6) | 182.0 | 0.289 | 1.3 |
| IPA ($C_3H_9N$) | 305.6 | 471.8 | 44.8 (658.4) | 221.0 | 0.291 | 1.2 |
| PA ($C_3H_9N$) | 321.7 | 497.0 | 48.1 (706.9) | 233.0 | 0.303 | 1.3 |
| DEA ($C_4H_{11}N$) | 328.6 | 496.5 | 37.1 (545.2) | 301.0 | 0.291 | 1.1 |
| DIPA ($C_6H_{15}N$) | 357.1 | 523.1 | 30.2 (443.8) | | 0.360 | 1.0 |
| DPA ($C_6H_{15}N$) | 382.5 | 555.8 | 29.9 (439.4) | | 0.471 | 1.0 |
| $H_2O$ | 373.2 | 647.3 | 218.3 (3208.1) | 57.1 | 0.344 | 1.8 |

$T_b$: Normal Boiling Point; $T_C$: Critical Temperature; $p_C$: Critical Pressure; $V_C$: Critical Volume; ω: Pitzer's Acentric Factor; DP: Dipole Moment

TABLE 4

Ions Concentrations in the Externally Seeded MSF Brine before Applying the CPP Process.

| Ion | Stream 1 (meq./L) | Stream 2 (meq./L) | Stream 3 (meq./L) |
|---|---|---|---|
| Cations: | | | |
| $Na^+$ | 1,010.4 | 3,251.0 | 1,122.4 |
| $K^+$ | 19.0 | 84.4 | 22.3 |
| $Mg^{+2}$ | 238.0 | 287.2 | 240.5 |
| $Ca^{+2}$ | 87.3 | 1,126.2 | 139.3 |
| $Sr^{+2}$ | None | 13.5 | 0.7 |
| Anions: | | | |
| $Cl^-$ | 1,146.6 | 4,752.8 | 1,326.9 |
| $SO_4^{-2}$ | 113.1 | 6.7 | 107.8 |
| Volume (B/D): | 475,000 (95%) | 25,000 (5%) | 500,000 (100%) |

Stream 1: MSF Brine Feed Stream;
Stream 2: "Calcium Chloride Rich" Formation Water to Seed MSF Brine;
Stream 3: Seeded MSF Brine before the CPP Treatment;
BPD: Barrel per Day (1 Barrel is equal to 42 Gallons).

TABLE 5

Ions Concentrations in the Externally Seeded Seawater before Applying the CPP Process.

| Ion | Stream 1 (meq./L) | Stream 2 (meq./L) | Stream 3 (meq./L) |
|---|---|---|---|
| Cations: | | | |
| $Na^+$ | 529.1 | 3,251.0 | 665.2 |
| $K^+$ | 10.7 | 84.4 | 14.4 |
| $Mg^{+2}$ | 125.9 | 287.2 | 134.0 |
| $Ca^{+2}$ | 27.0 | 1,126.2 | 82.0 |
| $Sr^{+2}$ | 0.2 | 13.5 | 0.9 |
| Anions: | | | |
| $Cl^-$ | 677.0 | 4,752.8 | 880.8 |
| $SO_4^{-2}$ | 64.6 | 6.7 | 61.7 |
| Volume (B/D): | 475,000 (95%) | 25,000 (5%) | 500,000 (100%) |

Stream 1: Seawater;
Stream 2: "Calcium Chloride Rich" Formation Water to Seed Seawater;
Stream 3: Seeded Seawater before the CPP Treatment;
BPD: Barrel per Day (1 Barrel is equal to 42 Gallons).

What is claimed is:

1. A method for separating sulfate from saline water to produce nearly sulfate-free saline stream and inorganic materials, said method comprising the steps of:
   (a) removing sulfate from said saline water by
      (i) mixing calcium chloride rich formation water with said saline water to allow the concentration of the calcium ion to exceed the concentration of the sulfate ion in said saline water to produce intermediate concentrate;
      (ii) pressurizing said intermediate concentrate into a precipitator at pressure between 50 psi and 1,200 psi through at least one nozzle to produce a jet stream of said intermediate concentrate;
      (iii) pressurizing amine solvent or amine solvent with modifier into said precipitator at pressure between 50 psi and the critical pressure of said amine solvent or said amine solvent with modifier through at least one nozzle to form precipitates comprising gypsum from said intermediate concentrate;
      (iv) removing said precipitates from said intermediate concentrate by filter to produce gypsum slurry;
      (v) removing at least most of said amine solvent or said amine solvent with modifier from said intermediate concentrate by stripper to produce said nearly sulfate-free saline stream;
   (b) injecting said nearly sulfate-free saline stream into subterranean formation for hydrocarbons recovery; or
   (c) feeding said nearly sulfate-free saline stream into conventional seawater desalinations plants and auxiliary equipments; or
   (d) producing de-ionized water from said nearly sulfate-free saline stream by membrane distillation;
   (e) producing gypsum boards or gypsum materials from said gypsum slurry by
      (i) separating said gypsum slurry into moist solid gypsum and liquor stream by filter;
      (ii) removing at least most of remaining said amine solvent or said amine solvent with modifier from said liquor stream by stripper;
      (iii) recycling said liquor stream to said intermediate concentrate;
      (iv) molding said moist solid gypsum to produce said gypsum boards or said gypsum materials;
      (v) allowing said gypsum boards or said gypsum materials to dry; or
   (f) producing potassium sulfate and calcium chloride from said gypsum slurry by
      (i) adding sylvite or sylvinite to said gypsum slurry to produce intermediate liquor stream;
      (ii) adding said amine solvent or said amine solvent with modifier to said intermediate liquor stream to form precipitates comprising said potassium sulfate;
      (iii) removing said precipitates from said intermediate liquor stream by filter;
      (iv) removing at least most of said amine solvent or said amine solvent with modifier by stripper;
      (v) recycling said intermediate liquor stream comprising at least dissolved calcium chloride to said intermediate concentrate; or
      (vi) recovering said intermediate liquor stream comprising at least calcium chloride brine.

2. The method of claim 1 wherein said saline water is seawater, brine streams from seawater desalination plants, sulfate-rich natural brine, flue gas desulphurization water, or a combination thereof.

3. The method of claim 1 wherein said calcium chloride rich formation water is aquifers water, oil-fields produced water, coal-bed produced water, methane-bed produced water or a combination thereof.

4. The method of claim 1 wherein said nozzle is coaxial nozzle, spray nozzle, vibrating nozzle, premixed nozzle, or a combination thereof.

5. The method of claim 1 wherein said amine solvent is selected from the group consisting of isopropylamine, propylamine, dipropylamine, diisopropylamine, ethylamine, diethylamine, methylamine, dimethylamine, or a combination thereof.

6. The method of claim 1 wherein said modifier is nitrogen, nitrous oxide, or a combination thereof.

7. The method of claim 1 wherein said filter is hydrocyclone, microfiltration, ultrafiltration, vacuum filter, press filter, centrifugal filter, electrostatic filter, or a combination thereof.

8. The method of claim 1 wherein said stripper is flash tank, distillation column, vacuum distillation, vacuum membrane distillation, pervaporation, or a combination thereof.

9. The method of claim 1 wherein said conventional seawater desalinations plants and auxiliary equipments are multi-stage flash, multi-effect distillation, vapor-compression, multi-effect submerged-tube evaporators, reverse osmosis, boilers, heat recovery steam generators, steam turbines, cooling towers, or a combination thereof.

10. The method of claim 1 wherein said membrane distillation is vacuum membrane distillation, direct contact membrane distillation, membrane osmotic distillation, or a combination thereof.

11. A method for separating sulfate and brucite from saline water to produce nearly sulfate-brucite free saline stream and inorganic materials, said method comprising the steps of
   (a) removing sulfate from said saline water by
      (i) mixing calcium chloride rich formation water with said saline water to allow the concentration of the calcium ion to exceed the concentration of the sulfate ion in said saline water to produce intermediate concentrate;
      (ii) pressurizing said intermediate concentrate into a precipitator at pressure between 50 psi and 1,200 psi through at least one nozzle to produce a jet stream of said intermediate concentrate;
      (iii) pressurizing amine solvent or amine solvent with modifier into said precipitator at pressure between 50 psi and the critical pressure of said amine solvent or said amine solvent with modifier through at least one nozzle to form precipitates comprising gypsum from said intermediate concentrate;
      (iv) removing said precipitates from said intermediate concentrate by filter to produce gypsum slurry;
      (v) removing at least most of said amine solvent or said amine solvent with modifier from said intermediate concentrate by stripper to produce said nearly sulfate-free saline stream;
   (b) removing brucite from said nearly sulfate-free saline stream by
      (i) pressurizing said nearly sulfate-free saline stream into a second precipitator at pressure between 50 psi and 1,200 psi through at least one nozzle to produce a jet stream of said nearly sulfate-free saline stream;
      (ii) pressurizing amine solvent or amine solvent with modifier into said second precipitator at pressure between 50 psi and the critical pressure of said amine solvent or said amine solvent with modifier through at least one nozzle to form precipitates comprising said brucite from said nearly sulfate-free saline stream;
      (iii) removing said precipitates from said nearly sulfate-free saline stream by filter to produce brucite slurry;
      (iv) removing at least most of said amine solvent or said amine solvent with modifier from said nearly sulfate-free saline stream by stripper to produce said nearly sulfate-brucite free saline stream;
   (c) injecting said nearly sulfate-brucite free saline stream into subterranean formation for hydrocarbons recovery; or
   (d) feeding said nearly sulfate-brucite free saline stream into conventional seawater desalinations plants and auxiliary equipments; or
   (e) producing de-ionized water from said nearly sulfate-brucite free saline stream by membrane distillation;
   (f) producing gypsum boards or gypsum materials from said gypsum slurry by
      (i) separating said gypsum slurry into moist solid gypsum and liquor stream by filter;
      (ii) removing at least most of remaining said amine solvent or said amine solvent with modifier from said liquor stream by stripper;
      (iii) recycling said liquor stream to said intermediate concentrate;
      (iv) molding said moist solid gypsum to produce said gypsum boards or said gypsum materials;
      (v) allowing said gypsum boards or said gypsum materials to dry; or
   (g) producing potassium sulfate and calcium chloride from said gypsum slurry by
      (i) adding sylvite or sylvinite to said gypsum slurry to produce intermediate liquor stream;
      (ii) adding said amine solvent or said amine solvent with modifier to said intermediate liquor stream to form precipitates comprising said potassium sulfate;
      (iii) removing said precipitates from said intermediate liquor stream by filter;
      (iv) removing at least most of said amine solvent or said amine solvent with modifier by stripper;
      (v) recycling said intermediate liquor stream comprising at least dissolved calcium chloride to said intermediate concentrate; or
      (vi) recovering said intermediate liquor stream comprising at least calcium chloride brine.

12. The method of claim 11 wherein said saline water is seawater, brine streams from seawater desalination plants, sulfate-rich natural brine, flue gas desulphurization water, or a combination thereof.

13. The method of claim 11 wherein said calcium chloride rich formation water is aquifers water, oil-fields produced water, coal-bed produced water, methane-bed produced water or a combination thereof.

14. The method of claim 11 wherein said nozzle is coaxial nozzle, spray nozzle, vibrating nozzle, premixed nozzle, or a combination thereof.

15. The method of claim 11 wherein said amine solvent is selected from the group consisting of isopropylamine, propylamine, dipropylamine, diisopropylamine, ethylamine, diethylamine, methylamine, dimethylamine, or a combination thereof.

16. The method of claim 11 wherein said modifier is nitrogen, nitrous oxide, or a combination thereof.

17. The method of claim 11 wherein said filter is hydrocyclone, microfiltration, ultrafiltration, vacuum filter, press filter, centrifugal filter, electrostatic filter, or a combination thereof.

18. The method of claim 11 wherein said stripper is flash tank, distillation column, vacuum distillation, vacuum membrane distillation, pervaporation, or a combination thereof.

19. The method of claim 11 wherein said conventional seawater desalinations plants and auxiliary equipments are multi-stage flash, multi-effect distillation, vapor-compression, multi-effect submerged-tube evaporators, reverse osmosis, boilers, heat recovery steam generators, steam turbines, cooling towers, or a combination thereof.

20. The method of claim 11 wherein said membrane distillation is vacuum membrane distillation, direct contact membrane distillation, membrane osmotic distillation, or a combination thereof.

21. A method for separating sulfate from saline water to produce nearly sulfate-free saline stream and inorganic materials, said method comprising the steps of:
   (a) separating calcium chloride rich produced water from wet oil by hydrophobic membranes;
   (b) removing sulfate from said saline water by
      (i) mixing said calcium chloride rich produced water with said saline water to allow the concentration of the calcium ion to exceed the concentration of the sulfate ion in said saline water to produce intermediate concentrate;
(ii) pressurizing said intermediate concentrate into a precipitator at pressure between 50 psi and 1,200 psi through at least one nozzle to produce a jet stream of said intermediate concentrate;
(iii) pressurizing amine solvent or amine solvent with modifier into said precipitator at pressure between 50 psi and the critical pressure of said amine solvent or said amine solvent with modifier through at least one nozzle to form precipitates comprising gypsum from said intermediate concentrate;
(iv) removing said precipitates from said intermediate concentrate by filter to produce gypsum slurry;
(v) removing at least most of said amine solvent or said amine solvent with modifier from said intermediate concentrate by stripper to produce said nearly sulfate-free saline stream;
(c) injecting said nearly sulfate-free saline stream into subterranean formation for hydrocarbons recovery; or
(d) feeding said nearly sulfate-free saline stream into conventional seawater desalinations plants and auxiliary equipments; or
(e) producing de-ionized water from said nearly sulfate-free saline stream by membrane distillation;
(f) producing gypsum boards or gypsum materials from said gypsum slurry by
  (i) separating said gypsum slurry into moist solid gypsum and liquor stream by filter;
  (ii) removing at least most of remaining said amine solvent or said amine solvent with modifier from said liquor stream by stripper;
  (iii) recycling said liquor stream to said intermediate concentrate;
  (iv) molding said moist solid gypsum to produce said gypsum boards or said gypsum materials;
  (v) allowing said gypsum boards or said gypsum materials to dry; or
(g) producing potassium sulfate and calcium chloride from said gypsum slurry by
  (i) adding sylvite or sylvinite to said gypsum slurry to produce intermediate liquor stream;
  (ii) adding said amine solvent or said amine solvent with modifier to said intermediate liquor stream to form precipitates comprising said potassium sulfate;
  (iii) removing said precipitates from said intermediate liquor stream by filter;
  (iv) removing at least most of said amine solvent or said amine solvent with modifier by stripper;
  (v) recycling said intermediate liquor stream comprising at least dissolved calcium chloride to said intermediate concentrate; or
  (vi) recovering said intermediate liquor stream comprising at least calcium chloride brine.

22. The method of claim 21 wherein said saline water is seawater, brine streams from seawater desalination plants, sulfate-rich natural brine, flue gas desulphurization water, or a combination thereof.

23. The method of claim 21 wherein said nozzle is coaxial nozzle, spray nozzle, vibrating nozzle, premixed nozzle, or a combination thereof.

24. The method of claim 21 wherein said amine solvent is selected from the group consisting of isopropylamine, propylamine, dipropylamine, diisopropylamine, ethylamine, diethylamine, methylamine, dimethylamine, or a combination thereof.

25. The method of claim 21 wherein said modifier is nitrogen, nitrous oxide, or a combination thereof.

26. The method of claim 21 wherein said filter is hydrocyclone, microfiltration, ultrafiltration, vacuum filter, press filter, centrifugal filter, electrostatic filter, or a combination thereof.

27. The method of claim 21 wherein said stripper is flash tank, distillation column, vacuum distillation, vacuum membrane distillation, pervaporation, or a combination thereof.

28. The method of claim 21 wherein said conventional seawater desalinations plants and auxiliary equipments are multi-stage flash, multi-effect distillation, vapor-compression, multi-effect submerged-tube evaporators, reverse osmosis, boilers, heat recovery steam generators, steam turbines, cooling towers, or a combination thereof.

29. The method of claim 21 wherein said membrane distillation is vacuum membrane distillation, direct contact membrane distillation, membrane osmotic distillation, or a combination thereof.

30. A method for separating sulfate and brucite from saline water to produce nearly sulfate-brucite free saline stream and inorganic materials, said method comprising the steps of:
(a) separating calcium chloride rich produced water from wet oil by hydrophobic membranes;
(b) removing sulfate from said saline water by
  (i) mixing calcium chloride rich produced water with said saline water to allow the concentration of the calcium ion to exceed the concentration of the sulfate ion in said saline water to produce intermediate concentrate;
  (ii) pressurizing said intermediate concentrate into a precipitator at pressure between 50 psi and 1,200 psi through at least one nozzle to produce a jet stream of said intermediate concentrate;
  (iii) pressurizing amine solvent or amine solvent with modifier into said precipitator at pressure between 50 psi and the critical pressure of said amine solvent or said amine solvent with modifier through at least one nozzle to form precipitates comprising gypsum from said intermediate concentrate;
  (iv) removing said precipitates from said intermediate concentrate by filter to produce gypsum slurry;
  (v) removing at least most of said amine solvent or said amine solvent with modifier from said intermediate concentrate by stripper to produce said nearly sulfate-free saline stream;
(c) removing brucite from said nearly sulfate-free saline stream by
  (i) pressurizing said nearly sulfate-free saline stream into a second precipitator at pressure between 50 psi and 1,200 psi through at least one nozzle to produce a jet stream of said nearly sulfate-free saline stream;
  (ii) pressurizing amine solvent or amine solvent with modifier into said second precipitator at pressure between 50 psi and the critical pressure of said amine solvent or said amine solvent with modifier through at least one nozzle to form precipitates comprising said brucite from said nearly sulfate-free saline stream;
  (iii) removing said precipitates from said nearly sulfate-free saline stream by filter to produce brucite slurry;
  (iv) removing at least most of said amine solvent or said amine solvent with modifier from said nearly sulfate-free saline stream by stripper to produce said nearly sulfate-brucite free saline stream;
(d) injecting said nearly sulfate-brucite free saline stream into subterranean formation for hydrocarbons recovery; or (e) feeding said nearly sulfate-brucite free saline stream into conventional seawater desalinations plants and auxiliary equipments; or
(f) producing de-ionized water from said nearly sulfate-brucite free saline stream by membrane distillation;
(g) producing gypsum boards or gypsum materials from said gypsum slurry by
  (i) separating said gypsum slurry into moist solid gypsum and liquor stream by filter;
  (ii) removing at least most of remaining said amine solvent or said amine solvent with modifier from said liquor stream by stripper;
  (iii) recycling said liquor stream to said intermediate concentrate;
  (iv) molding said moist solid gypsum to produce said gypsum boards or said gypsum materials;
  (v) allowing said gypsum boards or said gypsum materials to dry; or
(h) producing potassium sulfate and calcium chloride from said gypsum slurry by
  (i) adding sylvite or sylvinite to said gypsum slurry to produce intermediate liquor stream;
  (ii) adding said amine solvent or said amine solvent with modifier to said intermediate liquor stream to form precipitates comprising said potassium sulfate;
  (iii) removing said precipitates from said intermediate liquor stream by filter;
  (iv) removing at least most of said amine solvent or said amine solvent with modifier by stripper;
  (v) recycling said intermediate liquor stream comprising at least dissolved calcium chloride to said intermediate concentrate; or
  (vi) recovering said intermediate liquor stream comprising at least calcium chloride brine.

31. The method of claim 30 wherein said saline water is seawater, brine streams from seawater desalination plants, sulfate-rich natural brine, flue gas desulphurization water, or a combination thereof.

32. The method of claim 30 wherein said nozzle is coaxial nozzle, spray nozzle, vibrating nozzle, premixed nozzle, or a combination thereof.

33. The method of claim 30 wherein said amine solvent is selected from the group consisting of isopropylamine, propylamine, dipropylamine, diisopropylamine, ethylamine, diethylamine, methylamine, dimethylamine, or a combination thereof.

34. The method of claim 30 wherein said modifier is nitrogen, nitrous oxide, or a combination thereof.

35. The method of claim 30 wherein said filter is hydrocyclone, microfiltration, ultrafiltration, vacuum filter, press filter, centrifugal filter, electrostatic filter, or a combination thereof.

36. The method of claim 30 wherein said stripper is flash tank, distillation column, vacuum distillation, vacuum membrane distillation, pervaporation, or a combination thereof.

37. The method of claim 30 wherein said conventional seawater desalinations plants and auxiliary equipments are multi-stage flash, multi-effect distillation, vapor-compression, multi-effect submerged-tube evaporators, reverse osmosis, boilers, heat recovery steam generators, steam turbines, cooling towers, or a combination thereof.

38. The method of claim 30 wherein said membrane distillation is vacuum membrane distillation, direct contact membrane distillation, membrane osmotic distillation, or a combination thereof.

* * * * *